(12) United States Patent
Dunn et al.

(10) Patent No.: US 10,219,059 B2
(45) Date of Patent: Feb. 26, 2019

(54) SMART PASSENGER SERVICE UNIT

(71) Applicant: B/E AEROSPACE, INC., Wellington, FL (US)

(72) Inventors: Matthew Dunn, Stony Brook, NY (US); Eric Johannessen, Holbrook, NY (US); Gannon T. Gambeski, St. James, NY (US); John Terence Barker, Overland Park, KS (US); Ronnie R. Moss, Camano Island, WA (US); Jesse Richard Peck, Seattle, WA (US); Robert Linton, Bothell, WA (US); Jonathan Todzia, Farmingville, NY (US); Donald LaSala, Seaford, NY (US); Luis Sam, South Setauket, NY (US)

(73) Assignee: B/E Aerospace, Inc., Wellington, FL (US)

( * ) Notice: Subject to any disclaimer, the term of this patent is extended or adjusted under 35 U.S.C. 154(b) by 99 days.

(21) Appl. No.: 14/869,651

(22) Filed: Sep. 29, 2015

(65) Prior Publication Data

US 2016/0090192 A1 Mar. 31, 2016

Related U.S. Application Data

(60) Provisional application No. 62/057,133, filed on Sep. 29, 2014, provisional application No. 62/133,123, (Continued)

(51) Int. Cl.
*B64D 45/00* (2006.01)
*F21V 33/00* (2006.01)
(Continued)

(52) U.S. Cl.
CPC ......... *H04R 1/028* (2013.01); *B64D 11/0015* (2013.01); *B64D 11/00155* (2014.12);
(Continued)

(58) Field of Classification Search
CPC ...... H04R 1/028; H04R 1/28; H04R 2499/13; B64D 11/00155; B64D 11/0015;
(Continued)

(56) References Cited

U.S. PATENT DOCUMENTS

| 4,158,400 A | 6/1979 | Vice |
| 5,980,057 A | 11/1999 | Christie |

(Continued)

OTHER PUBLICATIONS

International Search Report and Written Opinion dated Sep. 7, 2016 in PCT/US2016/029460 filed Apr. 27, 2016.
(Continued)

*Primary Examiner* — Brian Wilson
(74) *Attorney, Agent, or Firm* — Donna P. Suchy

(57) ABSTRACT

Disclosed herein is an overhead passenger service unit (PSU) for a vehicle, comprising: a mounting mechanism for mounting the PSU above at least one vehicle seat; a dynamic seat row marker that provides an indication of a seat position and a status portion indicating a status of a passenger or trip aspect that is readily viewable from a vehicle aisle and is changeable during a trip; and a programmable active display that is readily viewable from a passenger seat and provides trip changeable information about the trip to the passenger.

18 Claims, 35 Drawing Sheets

Related U.S. Application Data filed on Mar. 13, 2015, provisional application No. 62/173,855, filed on Jun. 10, 2015.

(51) Int. Cl.
 *H04R 1/02* (2006.01)
 *B64D 11/00* (2006.01)
 *H04R 1/28* (2006.01)

(52) U.S. Cl.
 CPC ........... *F21V 33/0056* (2013.01); *H04R 1/28* (2013.01); *B64D 2011/0053* (2013.01); *B64D 2045/007* (2013.01); *B64D 2231/025* (2013.01); *H04R 2499/13* (2013.01); *Y02T 50/46* (2013.01)

(58) Field of Classification Search
 CPC ........ B64D 2231/025; B64D 2045/007; B64D 2011/0053; F21V 33/0056; Y02T 50/46
 USPC .......... 340/945–987, 691.1–693.12, 340/815.4–815.92
 See application file for complete search history.

(56) References Cited

U.S. PATENT DOCUMENTS

| | | | |
|---|---|---|---|
| 6,177,887 | B1 | 1/2001 | Jerome |
| 6,371,637 | B1 | 4/2002 | Atchinson et al. |
| 6,393,343 | B1* | 5/2002 | Frey ................ B64D 11/00 244/118.5 |
| 6,998,538 | B1 | 2/2006 | Fetterolf, Sr. et al. |
| 7,692,099 | B2 | 4/2010 | Burke |
| 7,784,957 | B2 | 8/2010 | Wright |
| 8,300,869 | B2 | 10/2012 | Marlin et al. |
| 8,806,543 | B1* | 8/2014 | Curtis ............ B64D 11/00151 244/118.6 |
| 2005/0280014 | A1 | 12/2005 | Park et al. |
| 2007/0018181 | A1 | 1/2007 | Steen et al. |
| 2007/0107277 | A1 | 5/2007 | Simms et al. |
| 2008/0298045 | A1* | 12/2008 | Wright ................ F21V 33/0056 362/86 |
| 2009/0323334 | A1 | 12/2009 | Roberts et al. |
| 2010/0188778 | A1 | 7/2010 | Castagna et al. |
| 2011/0216910 | A1* | 9/2011 | Lee .......... H04R 3/02 381/71.11 |
| 2011/0255711 | A1* | 10/2011 | Ivey ....................... H04R 1/028 381/104 |
| 2012/0230530 | A1* | 9/2012 | Schevardo ............ B64D 11/00 381/333 |
| 2012/0292986 | A1 | 11/2012 | Riedel et al. |
| 2012/0293342 | A9* | 11/2012 | Stoll ................ B64D 11/0015 340/945 |
| 2012/0307487 | A1* | 12/2012 | Eckel ....................... F21K 9/90 362/231 |
| 2013/0082984 | A1 | 4/2013 | Drzaic et al. |
| 2013/0105638 | A1 | 5/2013 | Umlauft et al. |
| 2013/0208490 | A1* | 8/2013 | Savian ............... B64D 11/0015 362/471 |
| 2015/0090839 | A1* | 4/2015 | Freund ............... B64D 11/0015 244/118.5 |
| 2015/0092429 | A1 | 4/2015 | Speer et al. |
| 2016/0053977 | A1 | 2/2016 | Johannessen et al. |

OTHER PUBLICATIONS

PCT International Search Report and Written Opinion issued in corresponding application PCT/US15/53022, dated Feb. 1, 2016, 12 pages.

Search Report dated Aug. 8, 2018 for European Patent Application No. 15846009.7.

* cited by examiner

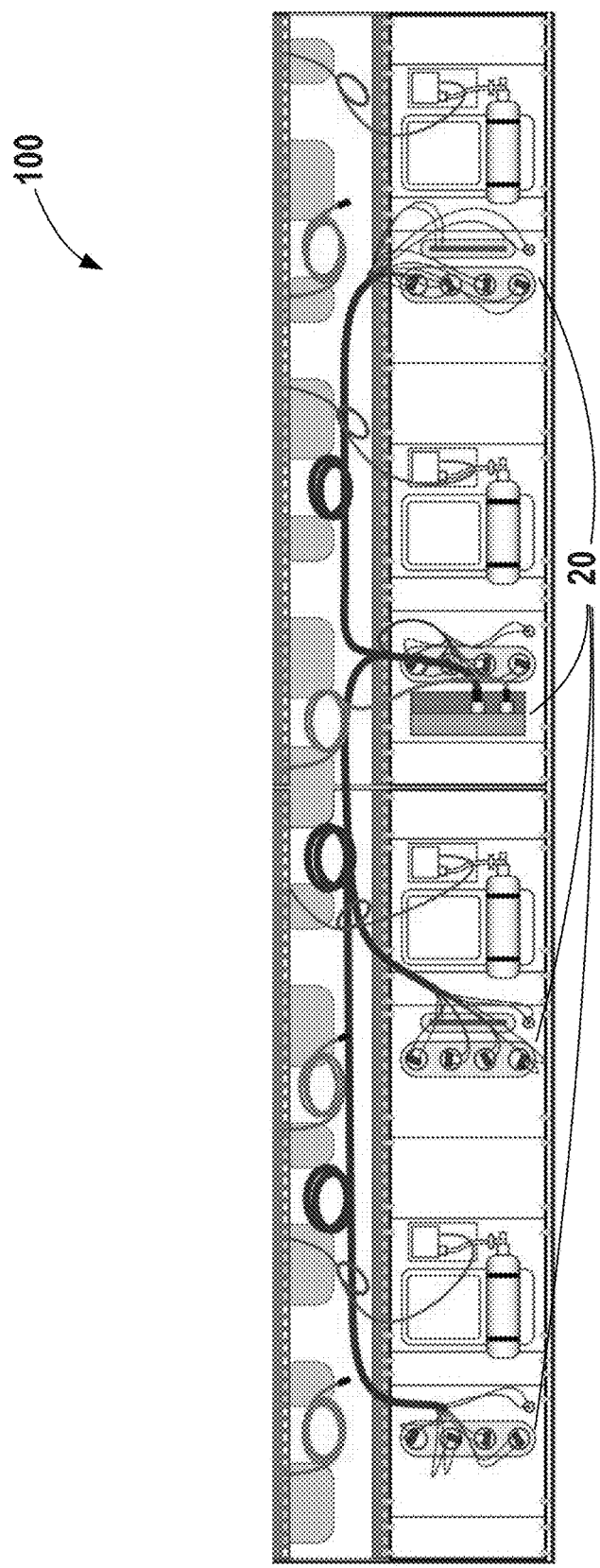

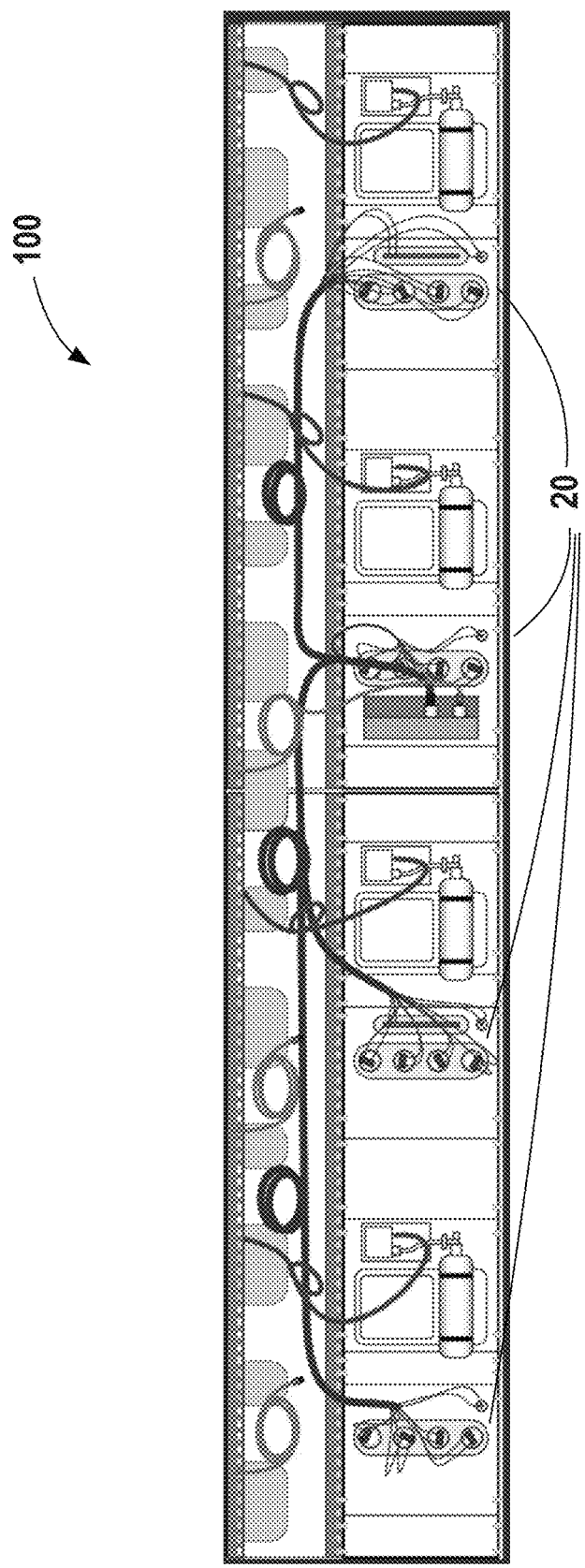

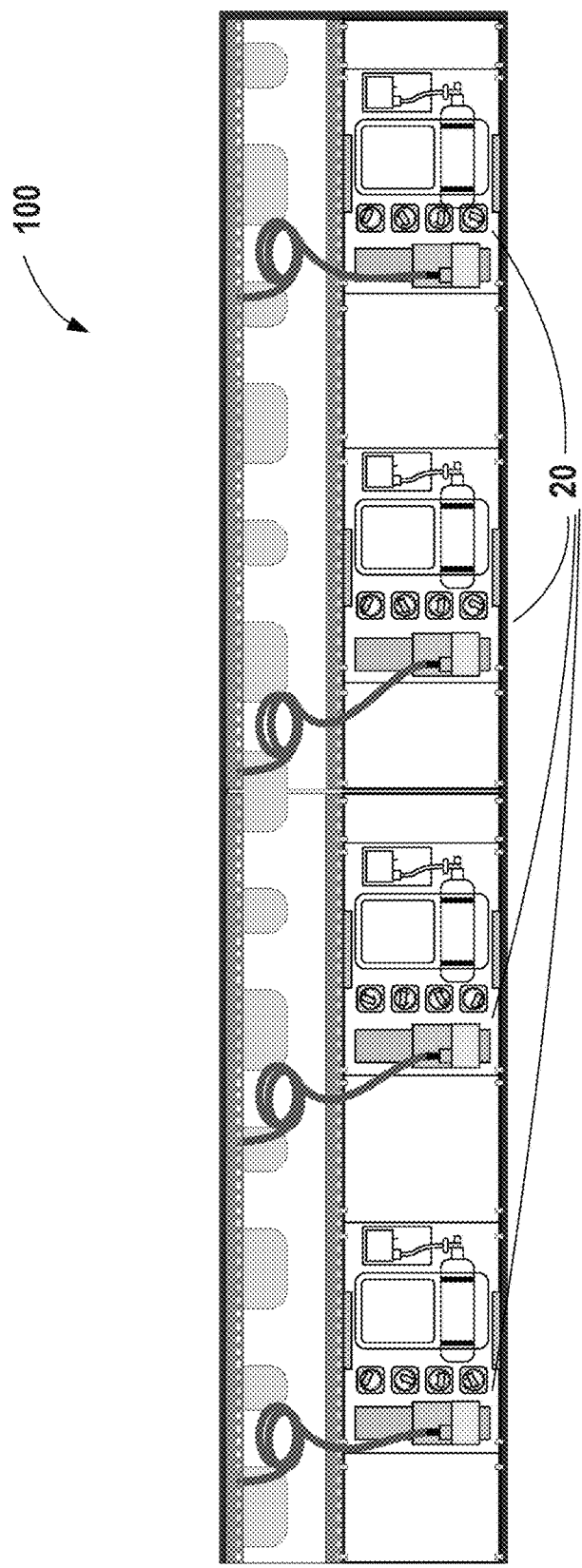

Wire Counts for 4 PAX PSUs
| Component | Example | Smart PSU |
|---|---|---|
| Lights | 8 | 0 |
| Ordinance | 6 | 0 |
| Attendant Call | 2 | 0 |
| Speaker | 2 | 2 |
| Power | 4 | 4 |
| Data | 0 | 4 |
| Total | 22 | 10 |
FIG. 6
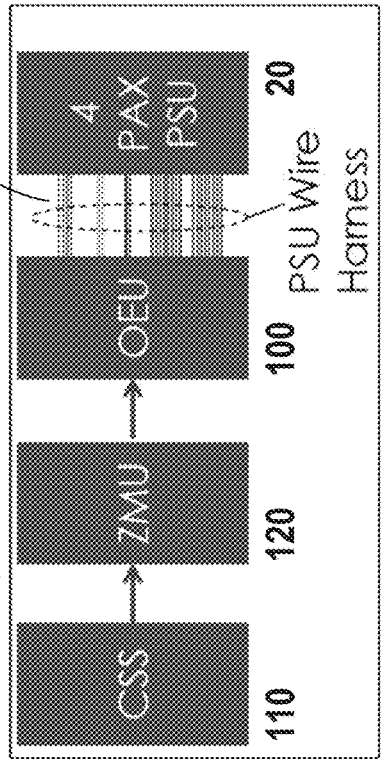
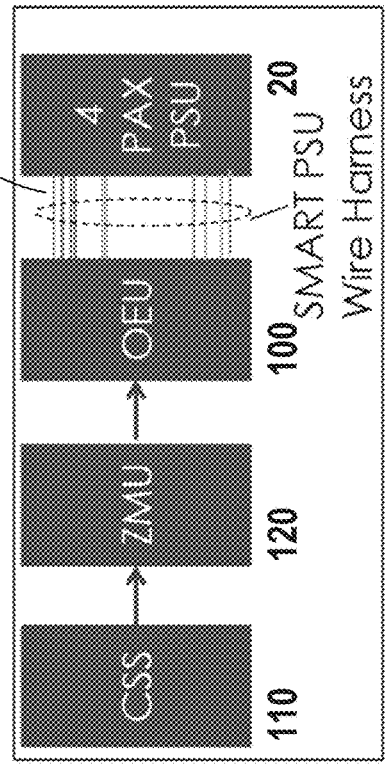

SMART PASSENGER SERVICE UNIT

CROSS REFERENCE TO RELATED APPLICATIONS

The present application claims the benefit of the following U.S. Provisional Patent Applications:

| Application No. | Filing Date |
|---|---|
| 62/057,133 | Sep. 29, 2014 |
| 62/133,123 | Mar. 13, 2015 |
| 62/173,855 | Jun. 10, 2015 | the contents of all being herein incorporated by reference.

BACKGROUND

A passenger service unit (PSU) is a unit provided on a vehicle that allows interaction between the vehicle's service providers and passengers, and provides necessary hardware/software for providing various passenger services. In an aircraft, this unit is typically located above a passenger's seat. In general, it is desirable to make PSUs highly functional, yet at the same time, keeping them simple, inexpensive, and lightweight.

SUMMARY

Disclosed herein is a PSU architecture design that incorporates features to convert input power (115 VAC/28 VDC) to supply control voltage and switching capability from digital communication signals to PSU components. This panel is mounted overhead in the aircraft and houses the passenger speaker, reading lights, attendant call lights, oxygen supply, and pulse oxygen controller. The Integrated PSU concept reduces part count and consolidates components such as heat-sinks, bezels, housings and wire harnesses. The architecture developed varies from the existing architecture design in that the PSU would also house the electrical components necessary to reduce electrical wiring throughout the aircraft and reduce the need for multiple overhead equipment units (OEUs), or separate power conversion and control modules throughout the aircraft.

TABLE OF ACRONYMS

| | |
|---|---|
| ACARS | Aircraft Communications Addressing Reporting System |
| ACP | Audio Control Panel |
| ASCII | American Standard Code for Information Interchange |
| AIMS | Airplane Information Management System |
| AMU | Audio Management Unit |
| AEP | Audio Entertainment Player |
| ASG | ARINC Signal Generator |
| ATA | Air Transport Association |
| ANS | Ambient Noise Sensor |
| ARINC | Aeronautical Radio, Inc. |
| AWG | American Wire Gauge |
| BIT | Built in Test |
| BITE | Built in Test Equipment |
| CACP | Cabin Area Control Panel |
| CAH | Cabin Attendant Handset |
| CAN | Controller Area Network |
| CCITT | Consulting Committee, The International Telegraph and Telephone |
| CCP | Cabin Control Panel |
| CCS | Cabin Communication System |
| CCSD | CSS Central Storage Device |
| CDR | Critical Design Review |

TABLE OF ACRONYMS -continued

| | |
|---|---|
| CDU | Control and Display Unit |
| CFS | Cabin File Server |
| CI | Cabin Interphone |
| CIS | Cabin Interphone System |
| CLS | Cabin Lighting System |
| CMCS | Central Maintenance Computer System |
| CP | Core Partition |
| CRC | Cyclic Redundancy Check |
| CSCP | Cabin System Control Panel |
| CSCP CP | CSCP Core Partition |
| CSCP DP | CSCP Display Partition |
| CSMU | Cabin System Management Unit |
| CSS | Cabin Services System |
| CW | Continuous Wave |
| dB | Decibels |
| dBc | Decibels relative to carrier level |
| dBm | Decibels relative to a milliwatt |
| dBmV | Decibels relative to a millivolt |
| DCAS | Digital Control Audio System |
| DCMF | Data Communication Management Function |
| DLS | Data Load System |
| DITS | Digital Information Transfer System |
| DP | Display Partition |
| D1MF | Dual Tone Multi-frequency |
| ECS | Environmental Control System |
| EEPROM | Electrically Erasable Programmable Read Only Memory |
| EICAS | Engine Indication Caution Alerting System |
| ELMS | Electrical Load Management System |
| EMC | Electromagnetic Compatibility |
| EMI | Electromagnetic Interference |
| ETOPS | Extended Twin Operations |
| FAR | Federal Aviation Regulation |
| FCC | Federal Communications Commission |
| FCM | Functional Circuit Module |
| FDD | Floppy Disk Drive |
| FDH | Flight Deck Handset |
| FMEA | Failure Modes and Effects Analysis |
| FSEU | Flap Slat Electronics Unit |
| FTK | Functional Test Kernel |
| FTP | File Transfer Protocol |
| GSE | Ground Support Equipment |
| GTR | General Technical Requirements |
| Hz | Hertz |
| IFE | In-Flight Entertainment (System/Unit) |
| IFES | In-Flight Entertainment System |
| INOP | Inoperable |
| ISO | International Standard Organization |
| LAN | Local Area Network |
| LAV | Lavatory |
| LCD | Liquid Crystal Display |
| LED | light emitting diode |
| LRU | Line Replaceable Unit |
| MAT | Maintenance Access Terminal |
| MCF | Monitor and Control Functions |
| MCDU | Multi-purpose Control and Display Unit |
| MCU | Modular Concept Unit |
| MMC | Mass Memory Card |
| MMo | Mach Number, Maximum Operating |
| MTBF | Mean Time Between Failure |
| NTSC | National Television Standard Committee |
| NVM | Non-volatile Memory |
| O.D. | Outside Diameter |
| OEU | Overhead Electronics Unit |
| OMS | Onboard Maintenance System |
| OPAS | Overhead Panel ARINC System |
| OPC | Operational Program Configuration |
| OPS | Operational Program Software |
| OSI | Open Systems Interconnect |
| PA | Passenger Address |
| PAL | Phase Alternation Line |
| PAS | Passenger Address System |
| PCB | Printed Circuit Board |
| PDR | Preliminary Design Review |
| PABX | Private Automatic Branch Exchange |
| PCU | Passenger Control Unit |
| POU | Passenger Overhead Unit |
| PRAM | Prerecorded Announcement Machine |

TABLE OF ACRONYMS

| | |
|---|---|
| PSEU | Proximity Electronic Sensor Unit |
| PSS | Passenger Service System |
| PSU | Passenger Service Unit |
| PTT | Push-To-Talk |
| RAM | Random Access Memory |
| RF | Radio Frequency |
| RPDU | Remote Power Distribution Unit |
| RTCA | Radio Technical Commission for Aeronautics |
| SCD | Specification Control Drawing |
| SCSRD | Standard Cabin System Requirements Document (D6-36440) |
| SDM | Speaker Drive Module |
| SDRL | Supplier Data Requirements List |
| SFE | Seller Furnished Equipment |
| SSU | Smart Service Unit |
| STC | Supplemental Type Certification |
| SWCM | Software Configuration Management |
| TBD | To Be Determined |
| TCF | Test Control Function |
| TCP/IP | Transmission Control Protocol/Internet Protocol |
| THD | Total Harmonic Distortion |
| TIU | Telephone Interface Unit |
| ULC | Universal Logic Card |
| VAC | Voltage, Alternating Current |
| VcAs | Velocity, Calibrated Air Speed |
| VDC | Volts Direct Current |
| VGA | Video Graphics Array |
| VIU | Video Interface Unit |
| VMo | Velocity, Maximum Operating |
| VTR | Video Tape Reproducer |
| WAP | Wireless Access Point |
| WES | Warning Electronics System |
| ZMU | Zone Management Unit |

A common data communication interface (i.e. RS-485 protocol) from the aircraft Cabin Management System (i.e., CSS, OEU, ZMU, etc.) may be provided to communicate with the passenger service units, and drive voltage requirements, reading light control, speaker audio signal, and manage power for call lights, accent lighting, and intelligent lighted seat row markers. Additionally, the controller can have the option of controlling a mood lighting edge on the passenger service unit, call light bezels that would light when activated, and emergency lighting if these features are selected. This integrated PSU module can also include the capability of interfacing with local and seat level control inputs.

Disclosed herein is an overhead passenger service unit (PSU) for a vehicle, comprising: a mounting mechanism for mounting the PSU above at least one vehicle seat; a dynamic seat row marker that provides an indication of a seat position and a status portion indicating a status of a passenger or trip aspect that is readily viewable from a vehicle aisle and is changeable during a trip; and a programmable active display that is readily viewable from a passenger seat and provides trip changeable information about the trip to the passenger.

This PSU may also comprise a lighting unit; an oxygen supply system; and a single connector for a single wire bundle that provides power and communications for the lighting unit, the dynamic seat row marker, the programmable active display, and the oxygen supply system.

Disclosed herein is also an integrated light-speaker unit, comprising: a speaker comprising a horn having a circular cross-section; a light mounted so that it is partially surrounded by the horn; and a single integral housing that contains both the light and the speaker.

Disclosed herein is also an integrated light-speaker unit, comprising: a speaker comprising a horn having a circular cross-section; a light mounted along a central longitudinal axis of the light speaker unit; and a single integral housing that contains both the light and the speaker.

DRAWINGS

Various embodiments of the invention are illustrated in the following drawings:

FIG. 3A is a pictorial top view diagram illustrating a first embodiment of an OEU with multiple PSUs;

FIG. 4A is a pictorial top view diagram illustrating a second embodiment of an OEU with multiple PSUs;

FIG. 5A is a pictorial top view diagram illustrating a third embodiment of an OEU with multiple PSUs;

FIG. 6 is a block diagram illustrating various wiring architectures related to the PSUs;

DETAILED DESCRIPTION

Described herein is a passenger service unit (PSU) for a vehicle (as described herein, the vehicle is an aircraft, but could be any vehicle with a PSU) with an intelligent design that forms a part of an integrated cabin system.

Figure 1:
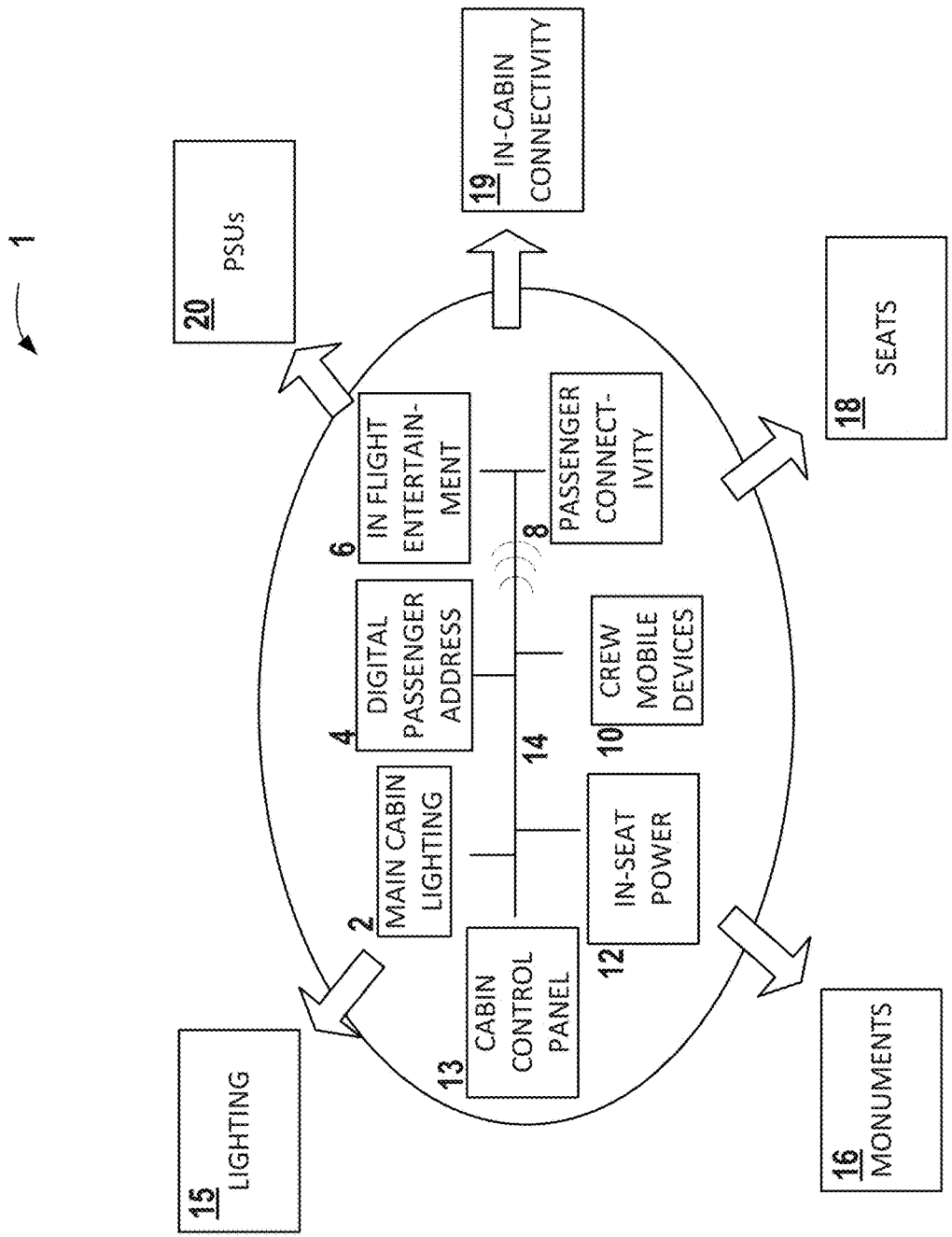
FIG. 1 is a block diagram illustrating various operational components of an aircraft interior.

FIG. 1 is a block diagram showing an overview of an integrated cabin system 1. The cabin systems comprise various elements that are able to communicate with one another over a common network 14. These elements include main cabin lighting 2, a passenger address system 4, in-flight entertainment (IFE) 6, passenger connectivity 8, crew mobile devices 10, in-seat power 12, and a control panel 13. These interact with or support a lighting system 15 that provides dynamic cabin lighting that creates an immersive experience for the passengers, monuments 16, such as galley inserts, lavatories, closets, dividers, entryways, and potable and waste water. The seat systems 18 integrate the IFE and passenger overhead unit (POU) power, actuation, reading lights, and controls. In-cabin connectivity 19 is provided for passengers, such as WiFi, Internet and IFE delivery, and entertainment content. Finally, the integrated cabin system includes the PSUs 20, which incorporate an attendant call, digital signage, displays, reading lights, etc.

Figure 2:
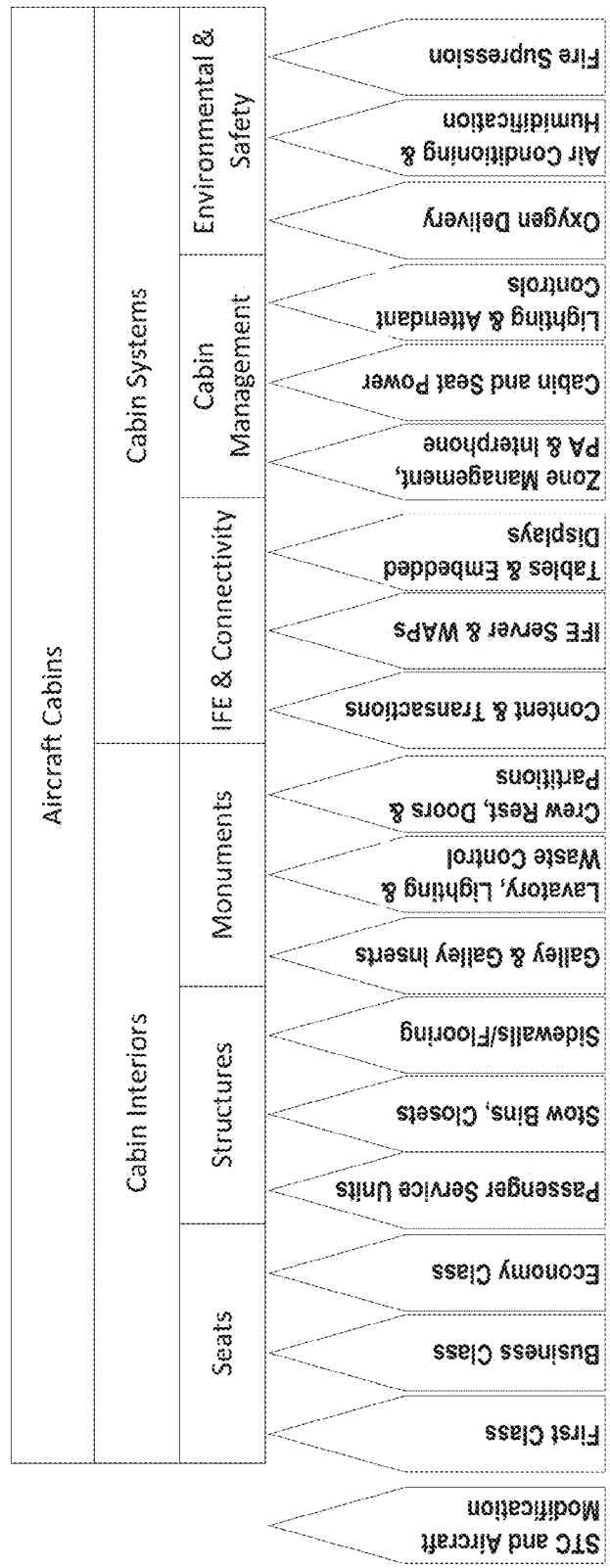
FIG. 2 is a block diagram illustrating the relationships of various components within the aircraft.

FIG. 2 provides a further breakdown of certain aircraft cabin components illustrated in FIG. 1. The aircraft cabin may be broken down into two primary elements: cabin interior and cabin system. Regarding the cabin interior (which includes seats, structures, and monuments), the seats may be broken down into first, business, and economy classes. The structures include PSUs, stow bins and closets, and sidewalls/flooring. The monuments include galley and galley inserts, lavatory lighting & waste control.

Regarding the cabin systems (which includes IFE & connectivity, cabin management, and environmental & safety), the IFE & connectivity may be broken down into content & transactions, IFE servers and WAPs, and tables & embedded displays. The cabin management may include zone management, PA, and interphone, cabin and seat power, and lighting & attendant controls. The environmental & safety may include oxygen delivery, air conditioning & humidification, and fire suppression. The aircraft modification shown on the left-hand side of FIG. 2 is overarching, and refers to modification of the aircraft as a whole. An OEM attains a type certificate (TC) from the FAA that grants regulatory authorization to fly the aircraft. All modifications done to the aircraft after original type certification are approved via amended type certificate (by the OEM) or Supplemental Type Certificate (STC) which is open for parties other than the OEM.

FIG. 3A illustrates an embodiment of a wiring architecture for PSUs 20 in which a group of PSUs 20 are shown. In the design shown, there are four PSUs 20 per OEU 100. The wiring allows cabin pressure to be monitored at each oxygen control module. The initiator sequencing is managed by a built-in test (BIT) power wire assert between the control modules in the column (of seats running fore and aft, and center column, on a twin aisle aircraft (left and right columns on a single aisle aircraft.

Figure 3B:
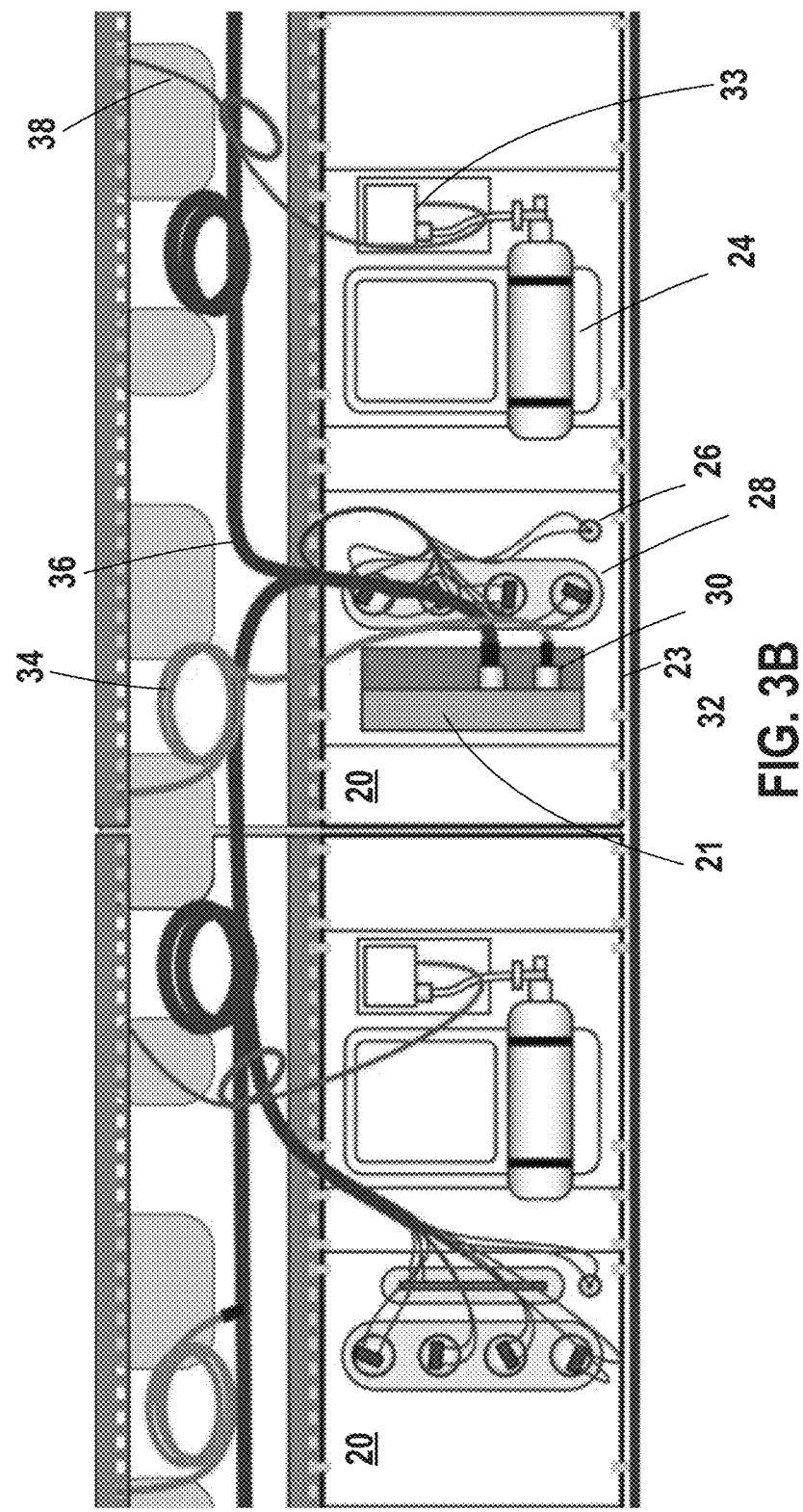
FIG. 3B is a pictorial top view diagram illustrating details of the PSU in FIG. 3A.
Figure 4B:
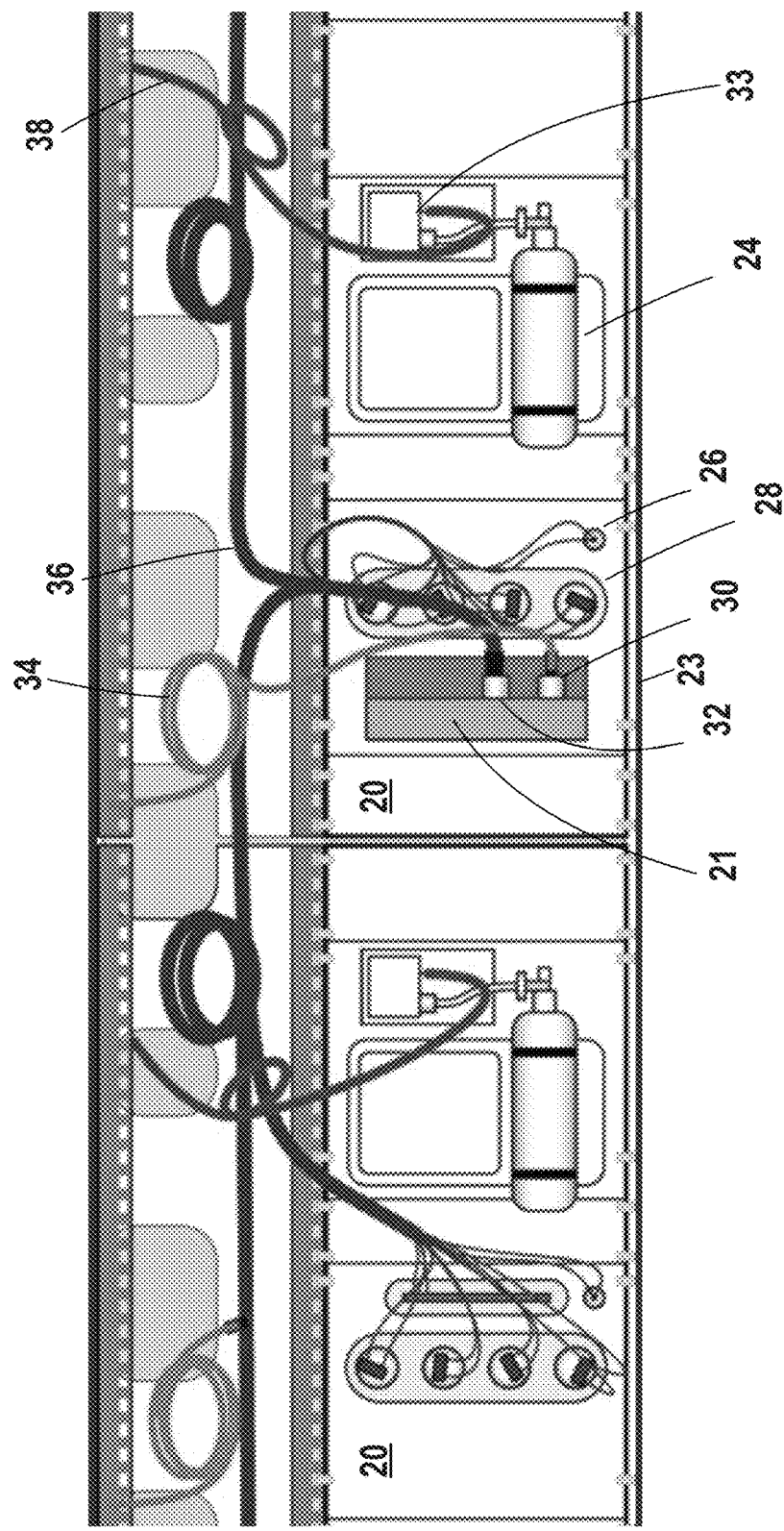
FIG. 4B is a pictorial top view diagram illustrating details of the PSU in FIG. 4A.

FIG. 3B is a more detailed diagram of the OEU shown in FIG. 3A and illustrates the composition of the PSUs 20 and associated wiring. The PSUs 20 can include a programmable active display (information sign) 21 that is readily viewable by a seated passenger and displays things such as "fasten seat belt" and "no personal electronic devices (PEDs)", a dynamic seat row marker 23 that is readily viewable from a vehicle aisle, an oxygen system 24 (with masks and associated deployment hardware), a call button 26, task lights 28, and first 30 and second 32 cable bundle connectors for connecting, respectively, first 34 and second 36 cable bundles to the PSU 20. There is also a third connector 33 for connecting the oxygen system cable bundle 38 to the oxygen system 24. In this design, the wiring requirements include a total of forty-eight wires, broken down as follows:

OEU Drops 34: an eight-wire bundle
  two for power (115 VAC)
  six for data (RS-485 in/out)
OEU Feeds 36: a common thirty-six wire bundle
  twenty for reading lights
  eight for ordinance
  eight for attendant call
Oxygen Power a four-wire bundle 38:
  main power (28 VDC, 5 A)
  backup power (28 VDC, 5 A)
  BIT power (28 VDC, 2.5 A)
  common FIGS. 4A and 4B illustrate an embodiment similar to that shown in FIGS. 3A and 3B, but also includes an oxygen system that has an altitude input module. In this configuration, the oxygen cable bundle 38 adds two additional wires to accommodate controller area network (CAN) (high/low) bus communications over which the altitude data can be sent and enabling health management. In this design, the wiring requirements include a total of fifty wires, broken down as follows:

OEU Drops 34: an eight-wire bundle
  two for power (115 VAC)
  six for data (RS-485 in/out)
OEU Feeds 36: a common thirty-six wire bundle
  twenty for reading lights
  eight for ordinance
  eight for attendant call
Oxygen Power a six-wire bundle 38:
  main power (28 VDC, 5 A)
  backup power (28 VDC, 5 A)
  BIT power (28 VDC, 2.5 A)
  common
  CAN (high/low)

Figure 5B:
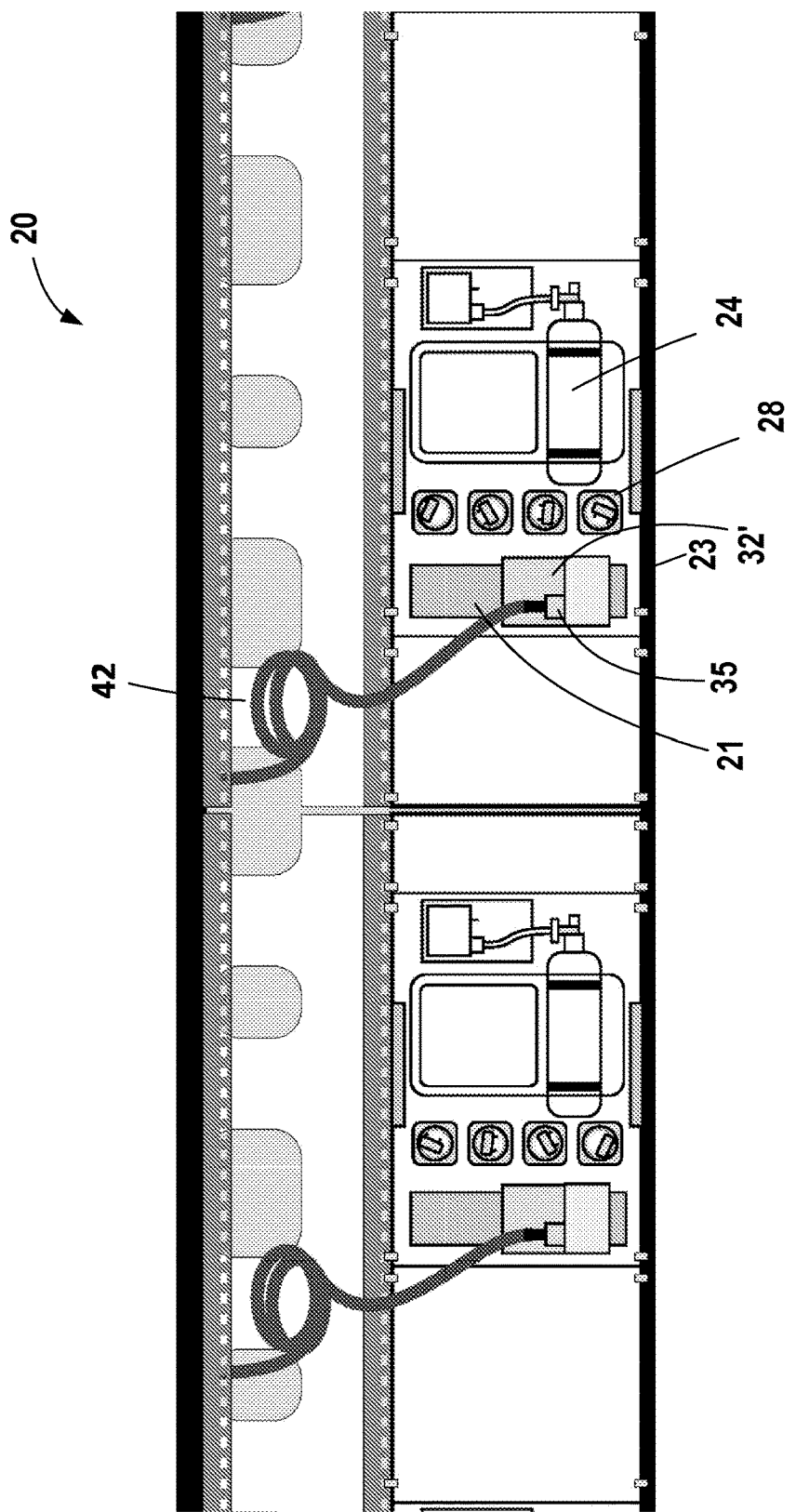
FIG. 5B is a pictorial top view diagram illustrating details of the PSU in FIG. 5A.

FIGS. 5A and 5B illustrate a more integrated embodiment in which a single wire bundle 42 connects to the PSU 20 via a single connector 40. In this embodiment, by way of example only, this may be a thirteen-wire bundle in which:

SU Drops 34': a thirteen-wire bundle
  three for O2 power (main, backup, and return)
  two for O2 CAN (high/low)
  two for SU power (inc. O2 BIT)
  six for SU data (RS-485 in/out)

This results in a significant reduction in wiring, connectors, weight, service burden, etc. for the aircraft. That is, the benefits of the integrated system include eliminating a significant amount of wiring, pinouts, OEUs, significantly simplifies the engineering by having a single, stable wire bundle for all layouts. It simplifies line fit operations and minimizes part number count. FIG. 6 illustrates wiring architectures according to various embodiments.

Figure 7:
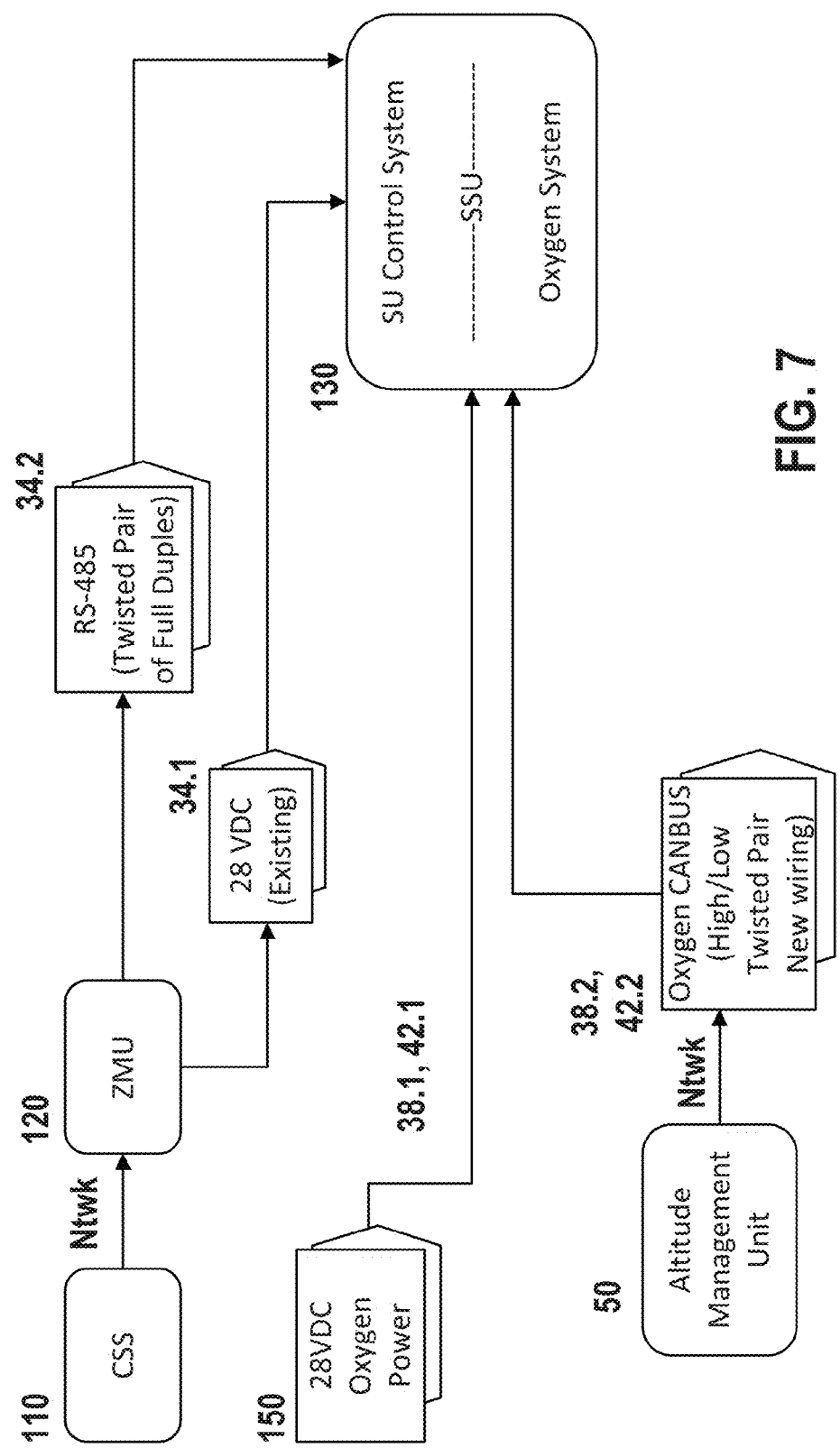
FIG. 7 is a block diagram illustrating the interconnected components, including oxygen system and altitude management unit.

FIG. 7 is an example block diagram layout according to an embodiment. The cabin services system (CSS) 110 is connected to a zone management unit (ZMU) 120 via some form of network. The ZMU 120 interfaces to the smart service unit (SSU) 130 providing power 34.1 (e.g., 28 VDC) and data communication 34.2 (e.g., RS-485) lines. Oxygen power 150 (e.g., 28 VDC) can also be provided via cable bundle 38.1. Finally, the altitude management unit 50 can be connected to the oxygen CANBUS interface via a network, and this interface is connected to the SSU 130 via cable bundle 38.2.

Figure 8:
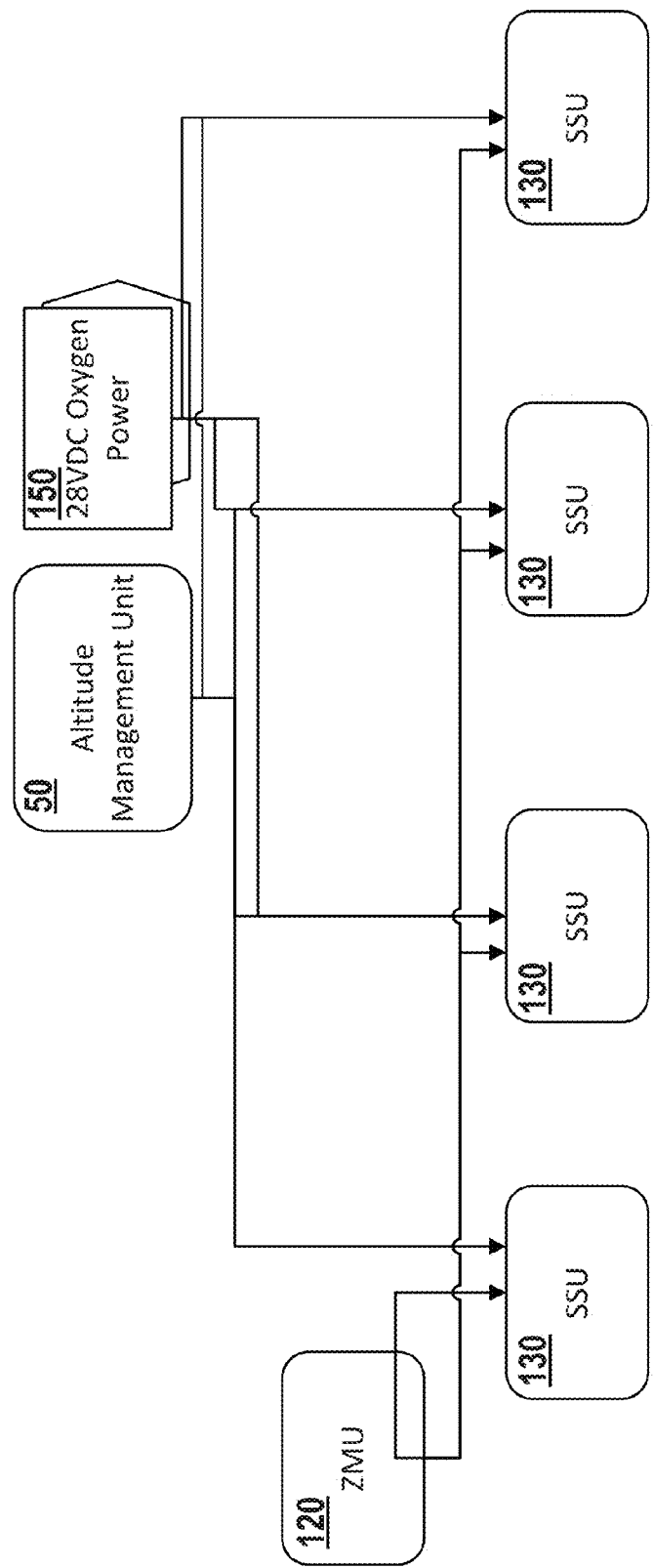
FIG. 8 is a block diagram illustrating an alternate approach for interconnecting the components.

FIG. 8 is an example block diagram layout similar to FIG. 7, where a single cable bundle 42 is provided to the SSU 130 (the cable branching occurs at other locations within the aircraft).

The SSU 130 reduces visual clutter for the passenger and provides a targeted delivery of information to the passenger, as is illustrated in the embodiments according to FIGS. G-K. The integrated systems permit PSU lighting scenes to be coordinated with the cabin scenes. They also permit a comprehensive onboard diagnostics and health management ability. The enhanced cabin crew communications provide a new tool to streamline cabin services.

Figure 32:
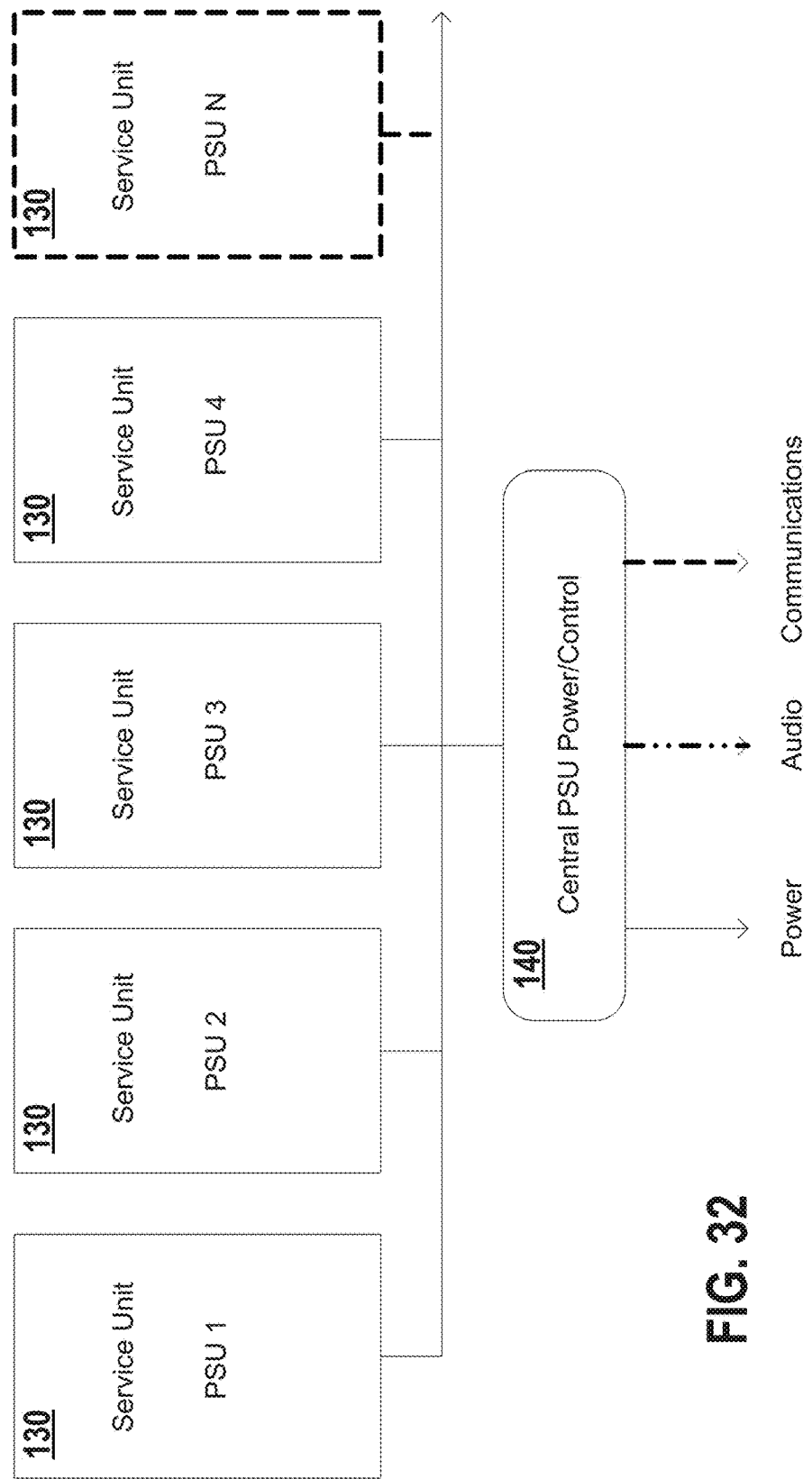
FIG. 32 is a block diagram illustrating the relationship between the service units and central service unit power/control in a centralized group or rib architecture.

FIG. 32 shows a networked interconnection between a number of service units 130 and the central service unit power/control 140 having interfaces to power, audio, and communications of the aircraft.

Figure 9:
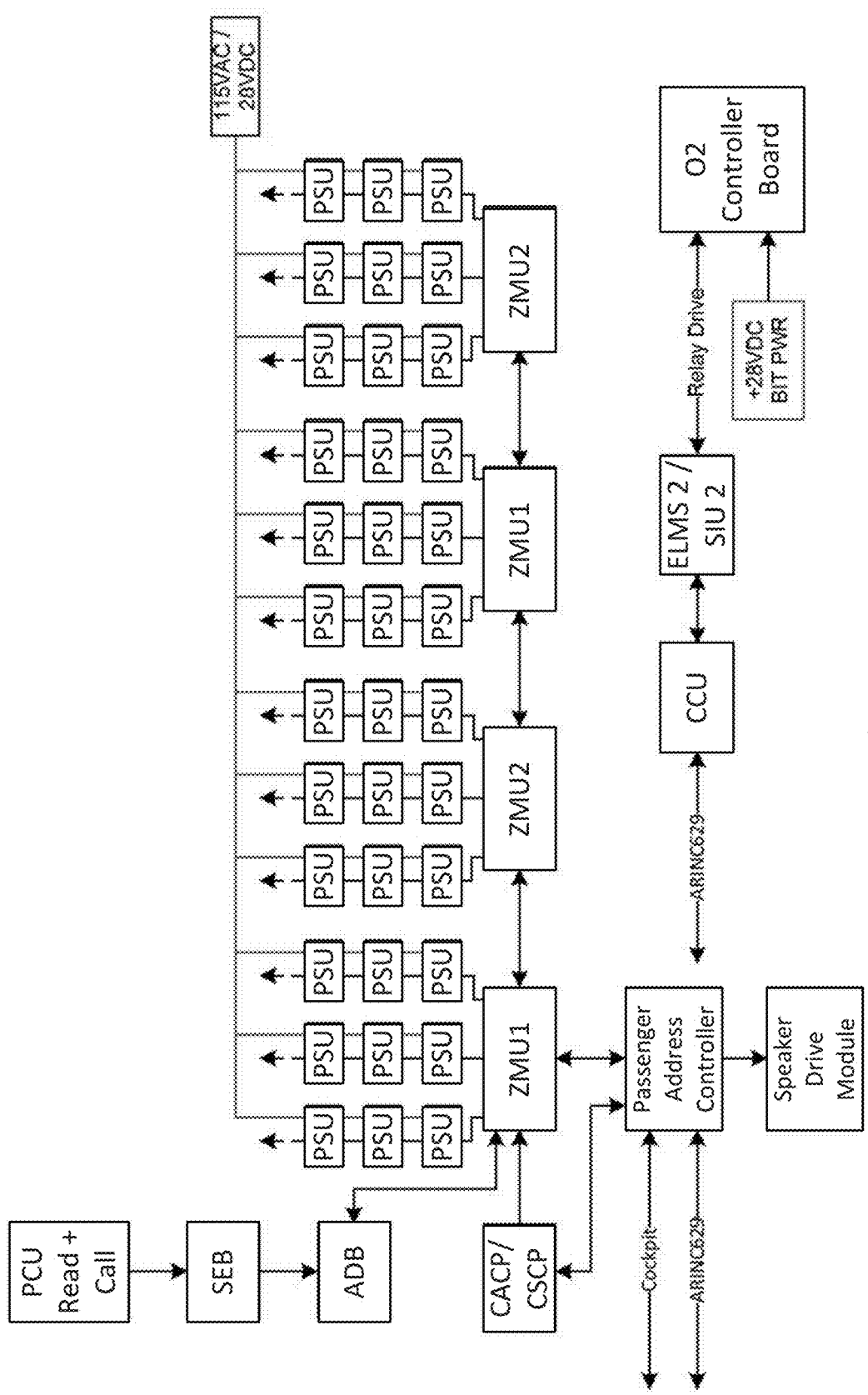
FIG. 9 is a block diagram illustrating additional components and interconnection hierarchy.

FIG. 9 is a block diagram illustrating an organization of the PSUs into zone management areas, each controlled by a zone management unit. It illustrates how the smart PSU elements can be integrated into an existing airplane system architecture. Everything connected with the leftmost lines on the PSU is existing. The components connected with the rightmost lines on the PSUs relate to the new "smart" PSU.

Figure 10:
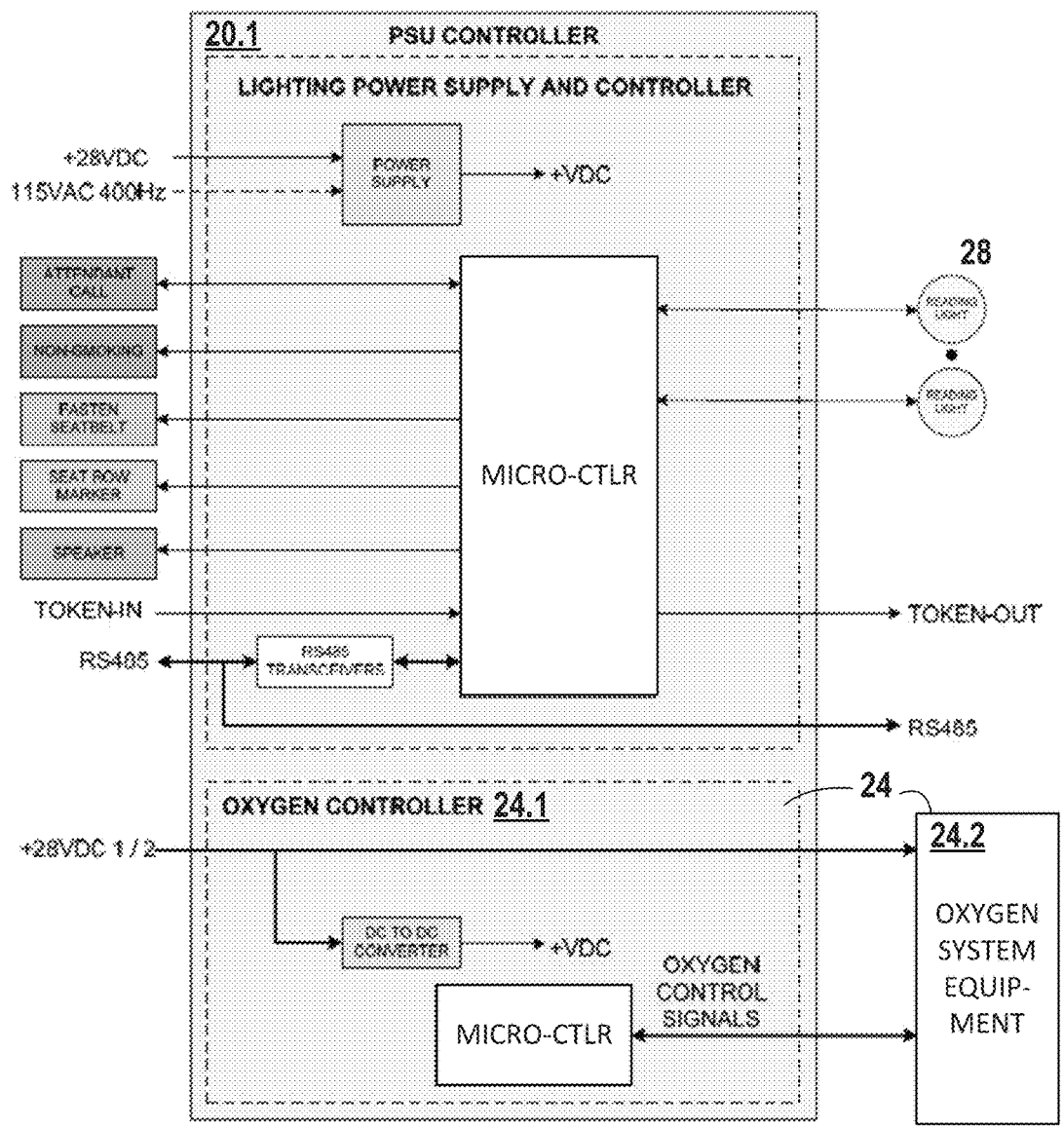
FIG. 10 is a block diagram illustrating an embodiment of a PSU controller and oxygen controller.

FIG. 10 is a block diagram illustrating both the PSU controller 20.1 and the oxygen controller 24.1. The PSU controller 20.1 contains a power supply that may take either AC (e.g., 115 VAC@400 Hz) or DC (e.g., 28 VDC) and convert it into DC voltage usable by the PSU controller. The PSU Controller contains a micro-controller with a communications interface for, e.g., RS-485 and a token-in, token-out communications. It also has I/O for the reading lights 28, attendant call, non-smoking display, fasten seatbelt display, seat row marker display, and the speaker. The oxygen controller 24.1 comprises a power supply converter and a micro-controller that interfaces with the oxygen system equipment 24.2.

Figure 11:
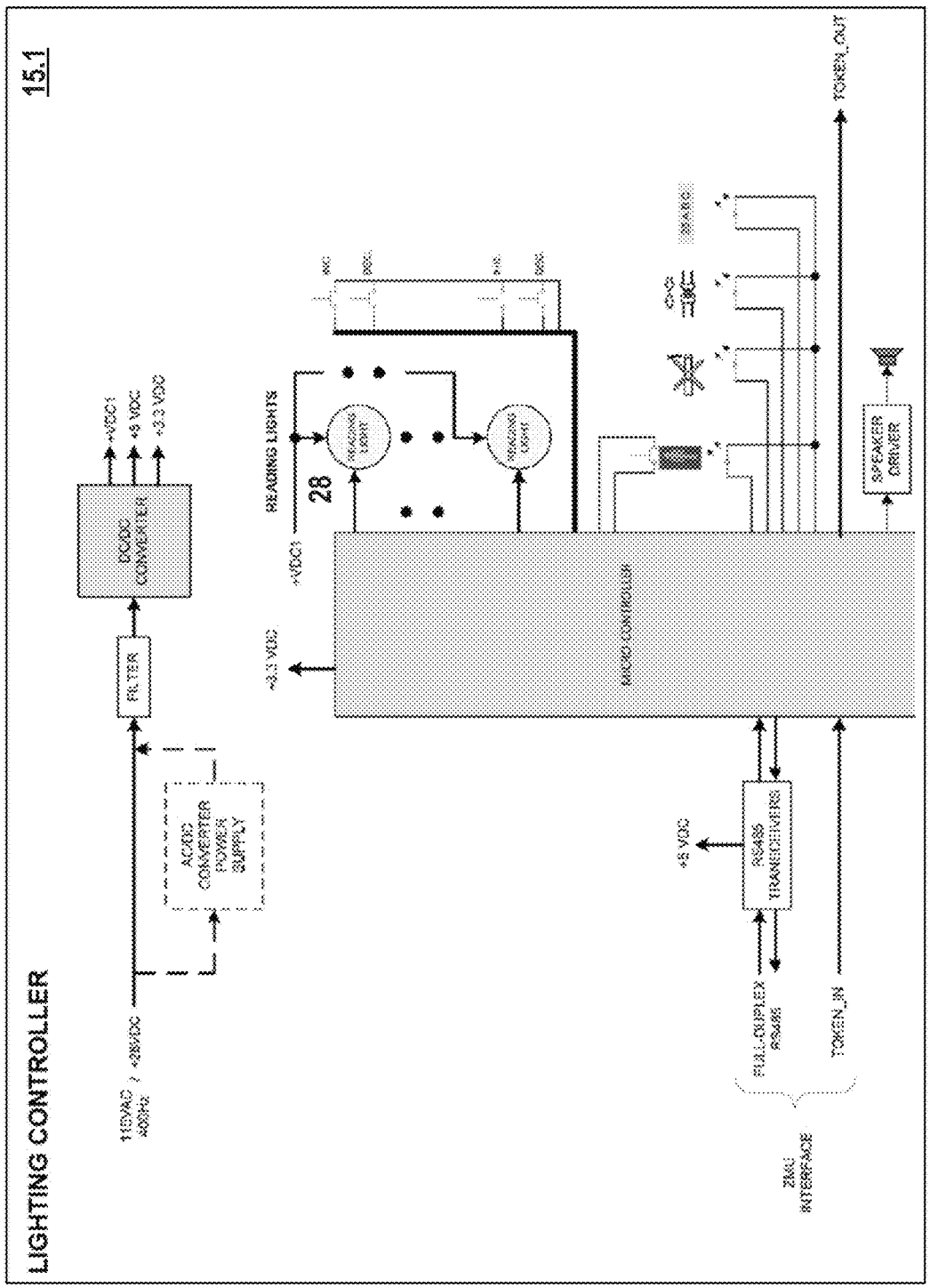
FIG. 11 is a block diagram illustrating an embodiment of a PSU controller and oxygen controller.

FIG. 11 is a block diagram for the lighting controller 15.1, also including a power supply and micro-controller. The micro-controller interfaces to the reading lights 28. In the previous FIG. 10, it shows the PSU controller interfacing to these lights. The lighting controller is a part of the PSU interface, and includes a zone management unit interface for RS-485 and token communications. FIG. 10 shows the PSU controller including both lighting and oxygen system control. FIG. 11 shows the lighting portion only, with slightly more detail.

Figure 12:
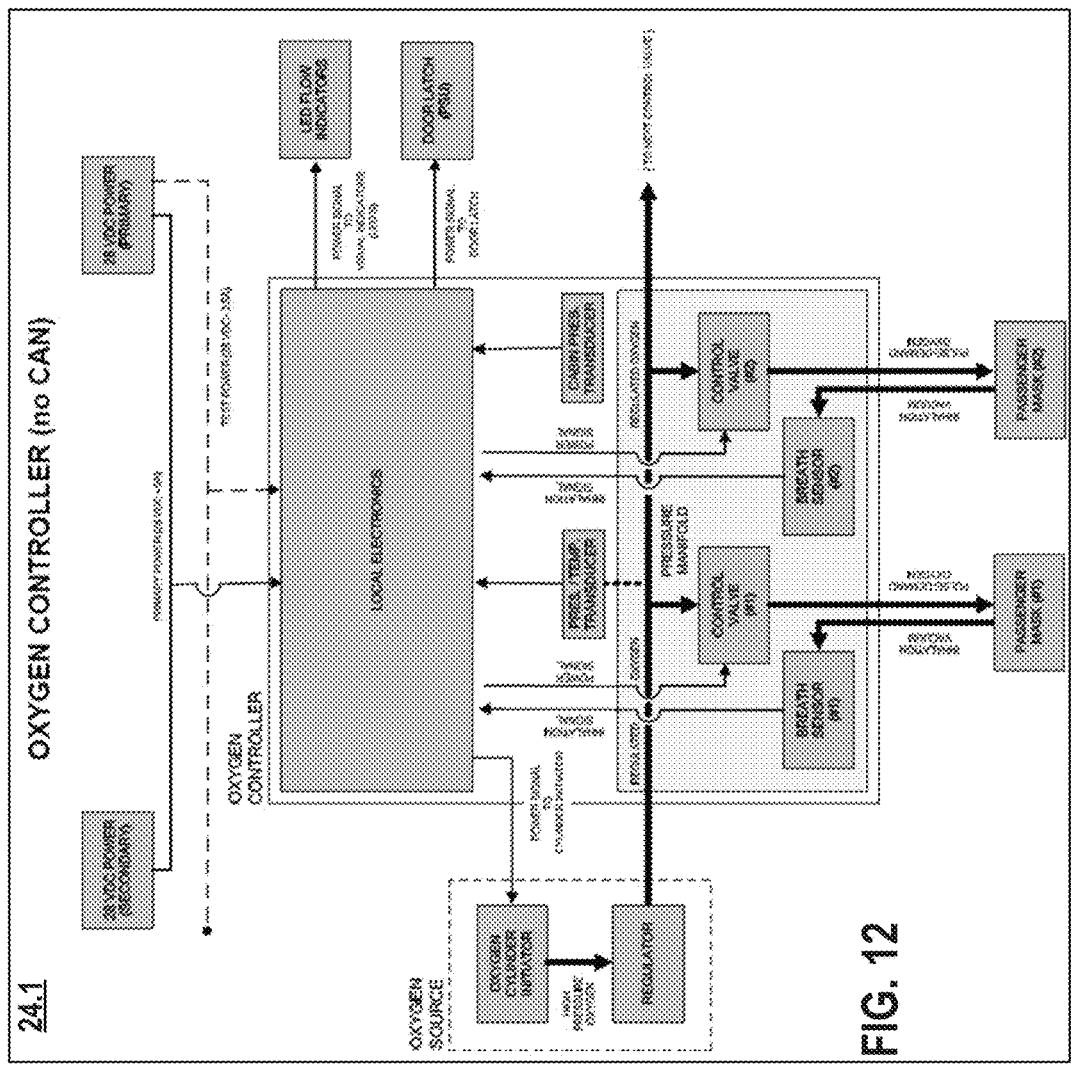
FIG. 12 is a detailed block diagram illustrating a first embodiment (no CAN) of the oxygen controller.

FIG. 12 is a block diagram illustrating the oxygen controller 24.1 in a no controller area network (CAN) configuration. The local electronics are powered by a power supply and provide an interface to LED flow indicators and the PSU door latch that opens the door to allow oxygen masks to drop. The local electronics also comprise an interface to the oxygen cylinder initiator that begins the flow of high pressure oxygen into a regulator. The regulator controls the correct amount of oxygen flow. The local electronics comprise interfaces to breath sensors, control valves for the regulated oxygen, a pressure/temperature transducer, and a cabin pressure transducer. The breath sensor and control valve interfaces with the passenger mask to ensure proper flow of oxygen to the user.

Figure 13:
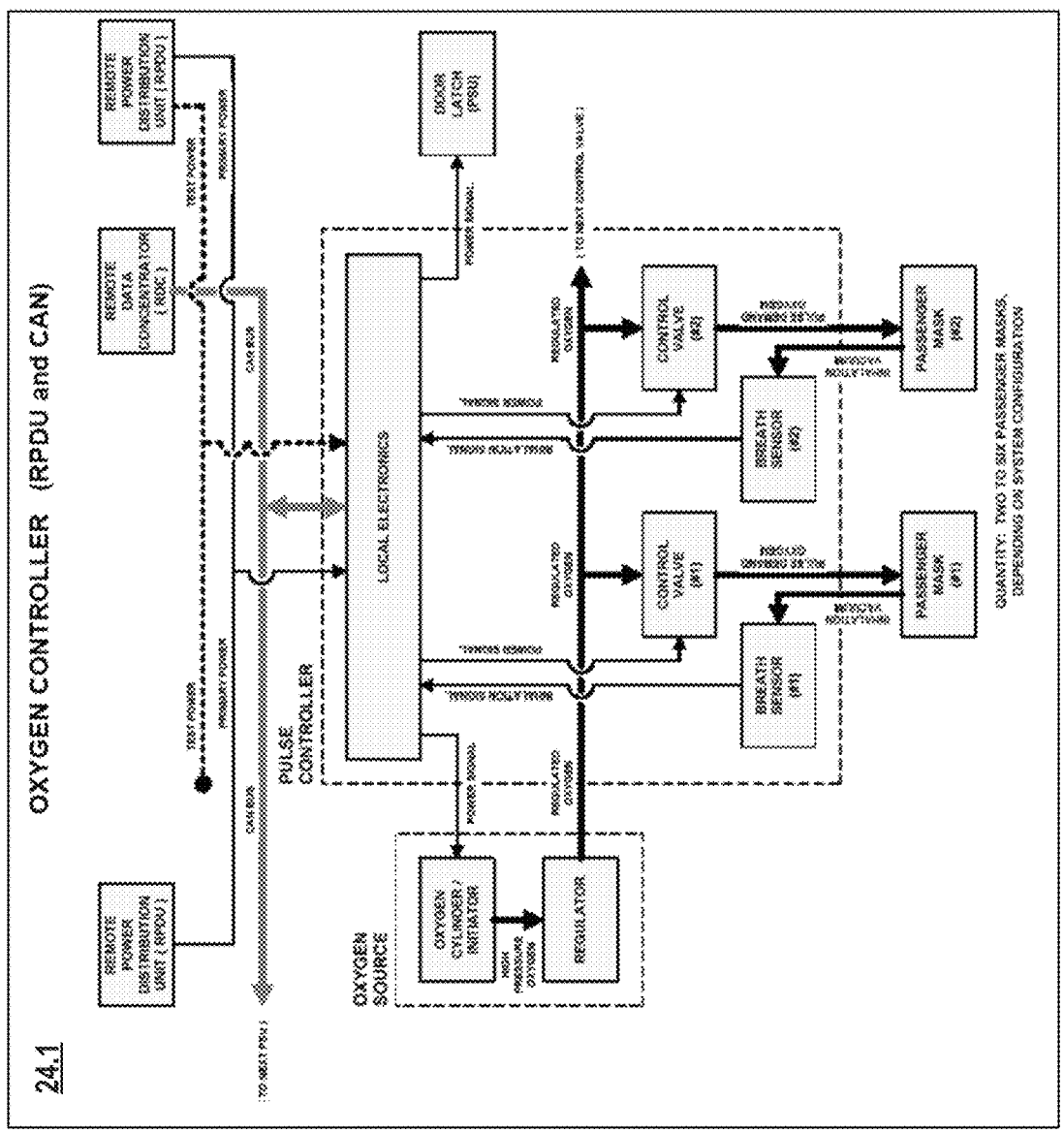
FIG. 13 is a detailed block diagram illustrating a second embodiment (RPDU and CAN) of the oxygen controller.

FIG. 13 is a block diagram illustrating the oxygen controller 24.1 using a remote power distribution unit (RPDU) and CAN configuration. In this configuration, the local electronics receive power from remote power distribution units and interface, via a CAN bus to a remote data concentrator (RDC). This illustrates the flexibility to adapt to the specific aircraft manufacturer and model databus configuration when different databus protocols are used.

Figure 14:
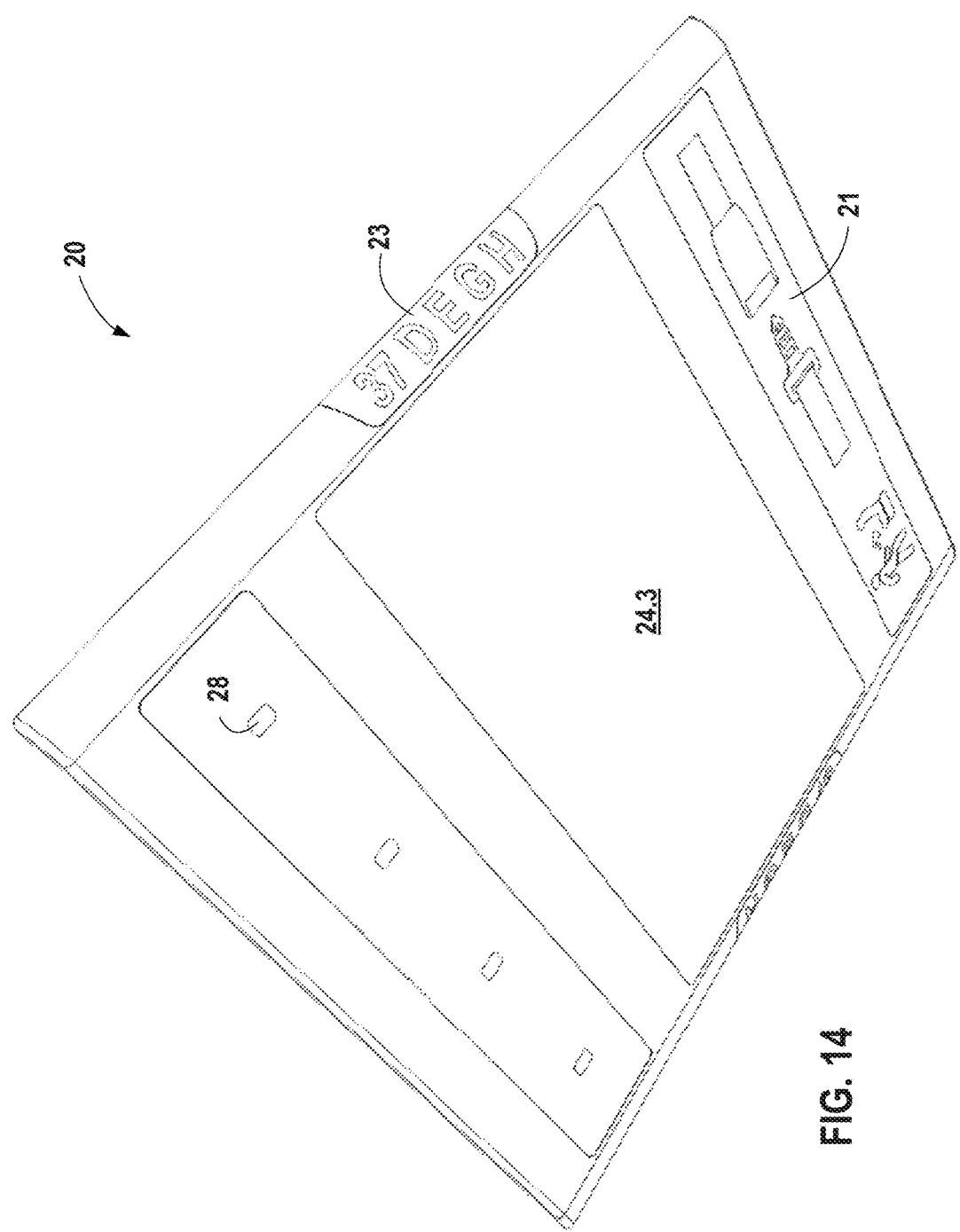
FIG. 14 is a bottom perspective pictorial view of a PSU.

FIG. 14 is a pictorial bottom perspective view of an embodiment of a PSU 20 shown in its mounted position. The active display 21 shows a current seatbelt and seating status, along with a seat row marker 23 and reading/task lights 28.

Figure 15:
FIG. 15 is a bottom perspective pictorial view of a mounted PSU (with seating components reflected in the reflective surface covering) during a boarding phase.
Figure 16:
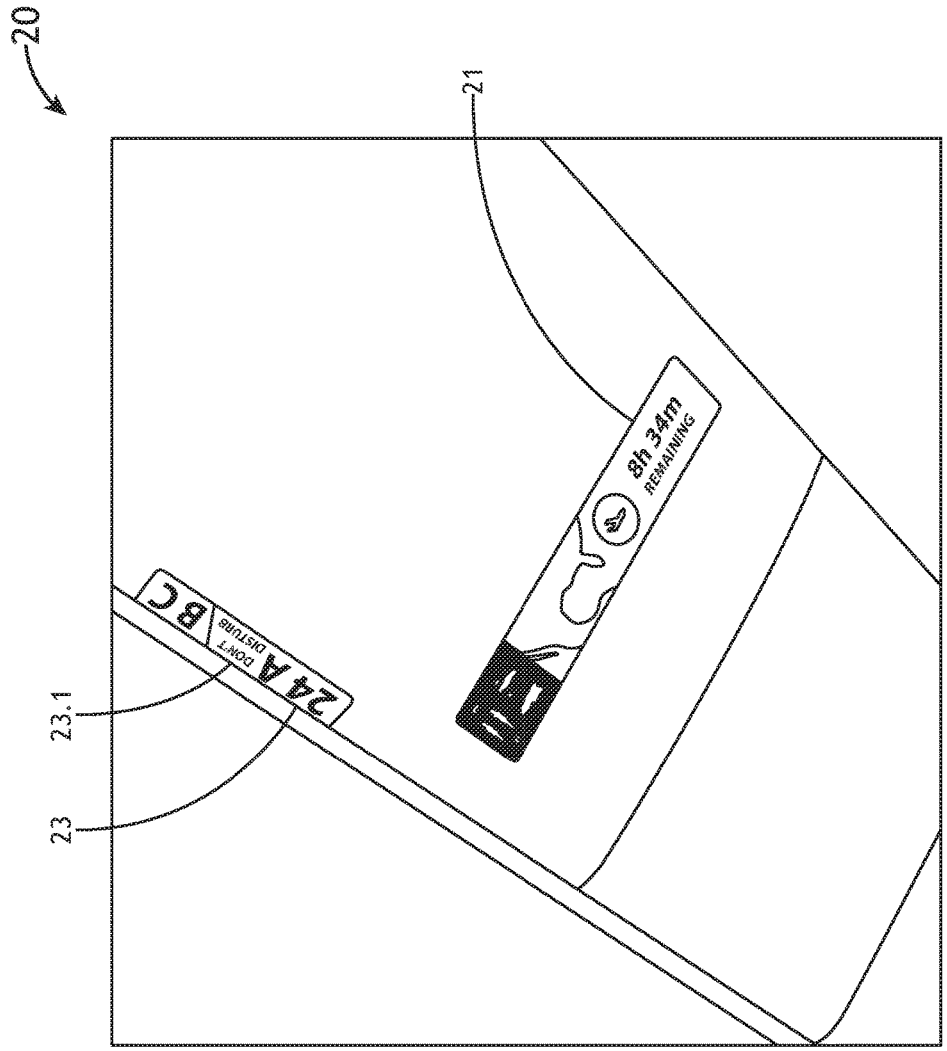
FIG. 16 is a bottom perspective pictorial view of a mounted PSU (with seating components reflected in the reflective surface covering) during a mid-flight phase.
Figure 17:
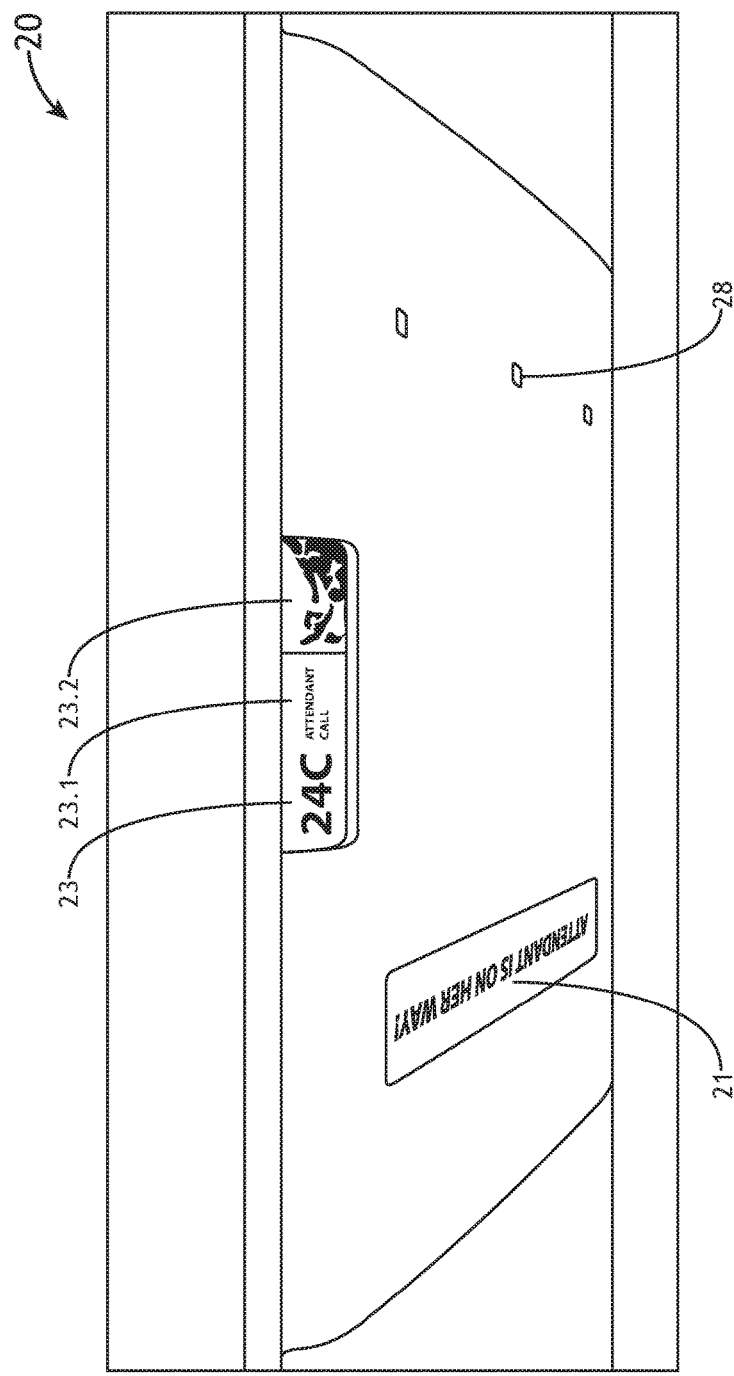
FIG. 17 is a bottom perspective pictorial view of an embodiment of a mounted PSU (with aircraft windows reflected in the reflective surface covering) after an attendant call has been activated.

FIG. 15 is a pictorial view showing the active display 21 of the PSU 20, e.g., during a boarding phase of the flight, indicating an amount of time until departure. As can be seen, the smooth surface contour features present reduced visual clutter to the user and allow many different languages (including seat-row individualized languages) to be easily presented to passengers. FIG. 16 shows the PSU 20 during a cruising portion of the flight, where a passenger has activated a do-not-disturb status 23.1. The remaining flight time is indicated in the active display 21, as well as a possible indication of the aircraft's position. FIG. 17 provides an illustration in which the active display 21 provides attendant call feedback along with the particular seat it relates to, and an additional status portion 23.2 provides an illustration of a passenger preference (e.g., type of meal). The seat row marker 23 can light up in different colors to indicate some form of status (e.g., to help the flight attendant navigate the cabin during meal service).

Figure 18:
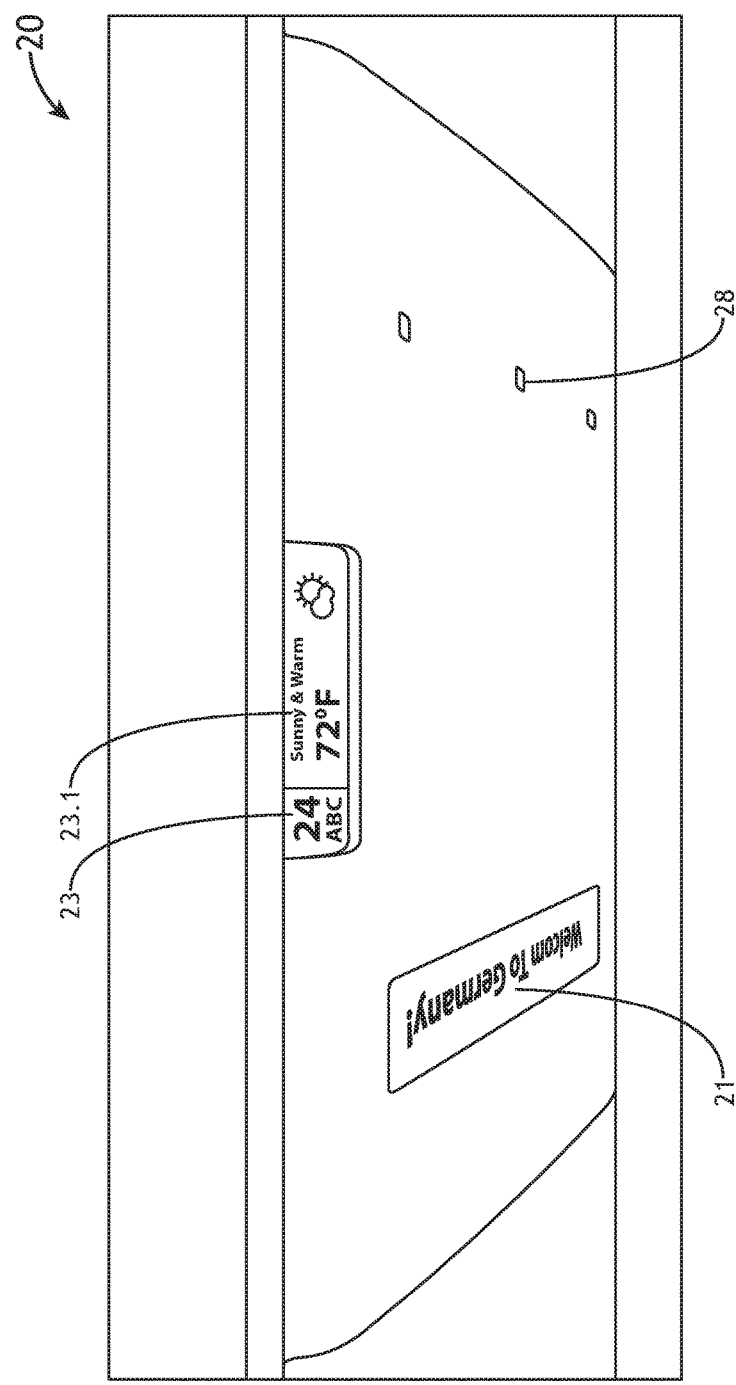
FIG. 18 is a bottom perspective pictorial view of an embodiment of a mounted PSU (with aircraft windows reflected in the reflective surface covering) after arrival.

Finally, FIG. 18 shows the PSU 130 during an arrival/deplaning phase, with a welcome message showing in the active display 21 and local weather information showing in the status portion 23.1 of the row marker 23. The PSU displays 21, 23 are connected to a centralized server unit that provides relevant status. Updates can be triggered periodically or as a result of a change of a situation, such as the passenger providing some input or some predefined point in the flight being reached. In the deplaning phase, the PSU displays 21, 23 can be programmed to provide passengers information about the destination as well as transfer and luggage claim information and directions.

Figure 19:
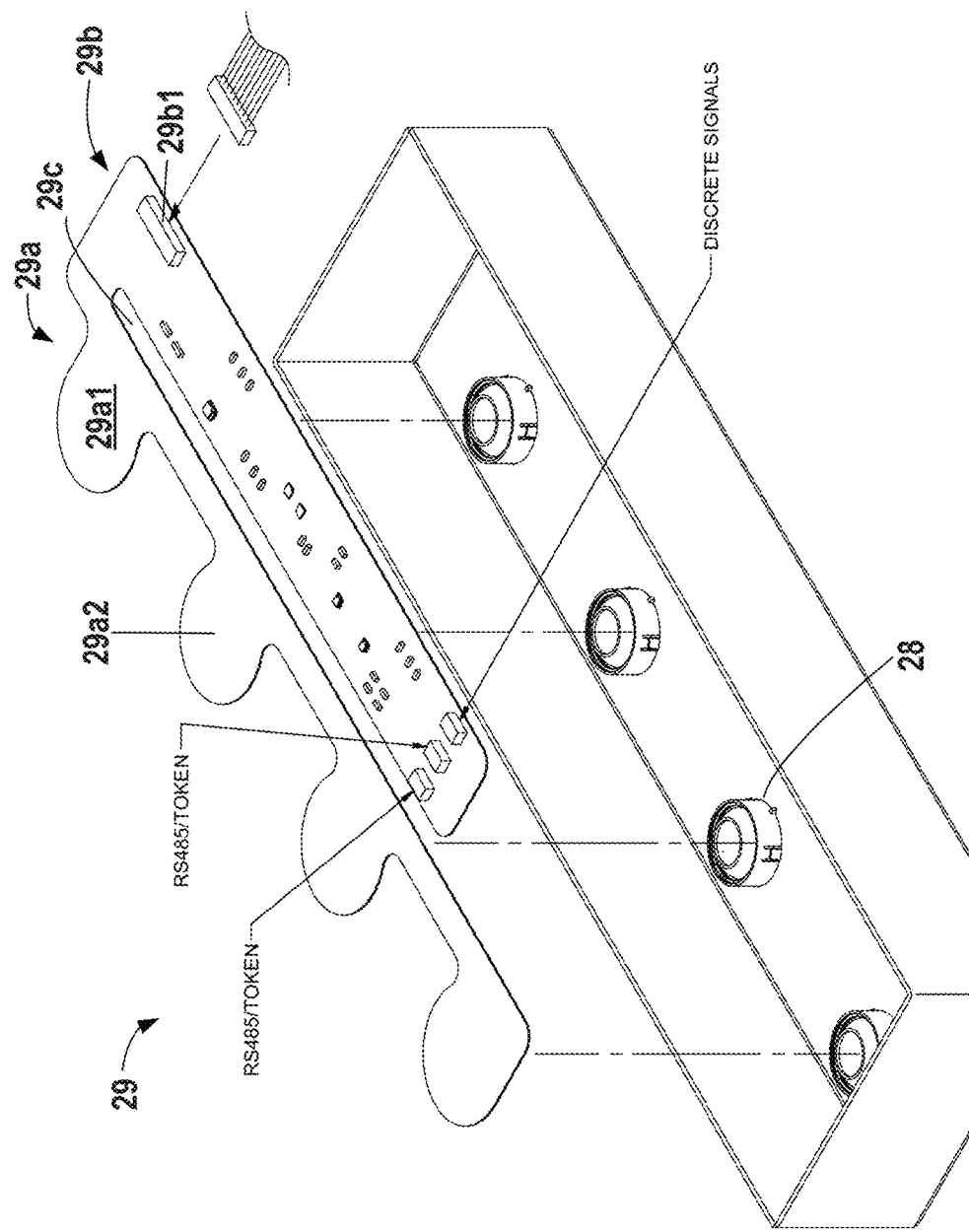
FIG. 19 is a top pictorial exploded perspective view of an embodiment using a flexible PCB.
Figure 20:
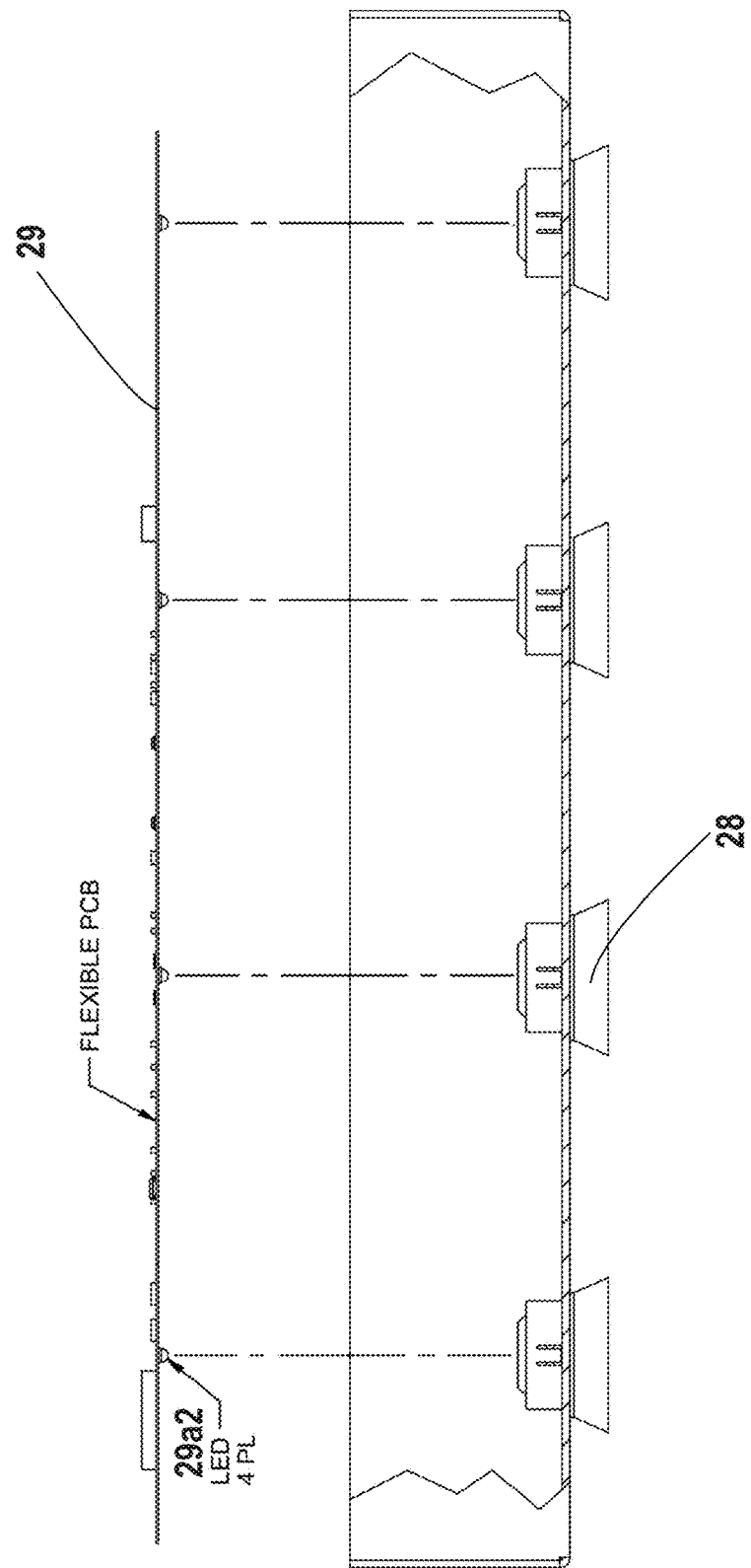
FIG. 20 is an exploded side view of the embodiment shown in FIG. 19.

FIG. 19 is an exploded perspective view that illustrates the use of a flexible printed circuit board (flex PCB) 29 as a basis for a lighting unit containing light emitting diode (LED) lights 28. The flex PCB 29 is designed in a manner that keeps the components in a relatively tight packing space and on a single PCB, yet significantly thermally isolates the LEDs from the circuitry by the use of a U-shaped channel 29c that segregates the PCB 29 into an LED potion 29a, and a control circuitry portion 29b. The LED comprises an LED extension portion 29a1 that extends laterally and comprises the LED 29a2 itself. The control circuitry portion 29b comprises a connector that provides the PCB 29 power and control signals, and circuitry for communicating and controlling the LEDs. FIG. 20 is an exploded side view of the LED lights 28 with flex PCB 29.

Various configurations for the PSU 20 are envisioned that offer a range of feasible architectural solutions for the lighting requirements including a unique integrated speaker approach for PSU panels 20. These can reduce part numbers, leverage common parts, and support all uses in the cabin including passenger seating areas, attendant seating areas, galley work areas, crew rest areas, cross aisle areas and in the lavatories as required. In summary, design solutions include: variations on a traditional architecture, a centralized architecture, a centralized architecture with integrated speaker, and a centralized rib or group architecture. These architectures provides LED based lighting solutions that leverage traditional as well as modular line replaceable unit (LRU) task/reading light technologies and solutions.

In the variations on the traditional architecture, all of the lights may be individual LRUs and hence are vertically integrated components or they may alternatively leverage modular technology methods for all lighting applications. The modular approach has significant merits including enabling increased commonality of subassemblies, greater flexibility in manufacturing, easy removal/installation on the assembly line or in the field. Additionally, these lights can have all of the benefits of new LED technology including: smooth on/off transitions and optional dimming; multiple color temperatures, color rendering index (CRI) and dispersion angle options; and improved reliability and mean time between failure/mean time between unit replacement (MTBF/MTBUR).

Furthermore, the variations on the traditional architecture can support an existing style OEU 100 and/or PSU 20, power and control feeds or other controllers that individually interface to each PSU/LRU. This requires a separate power run for each light, sign, marker, etc. Signals are discrete and may include some form of communications (TIA-485 or CANbus). The LED task/reading lights and other LEDs lights can be designed to support an 11.4 VAC/VDC-30 VAC/VDC input range or other input range as required. Each LRU may require its own power supply to interface with the power bus. An optional 115 VAC, 400 Hz style task/reading light can be provided and would require a separate power supply that may be incorporated in external electronics.

Figure 25:
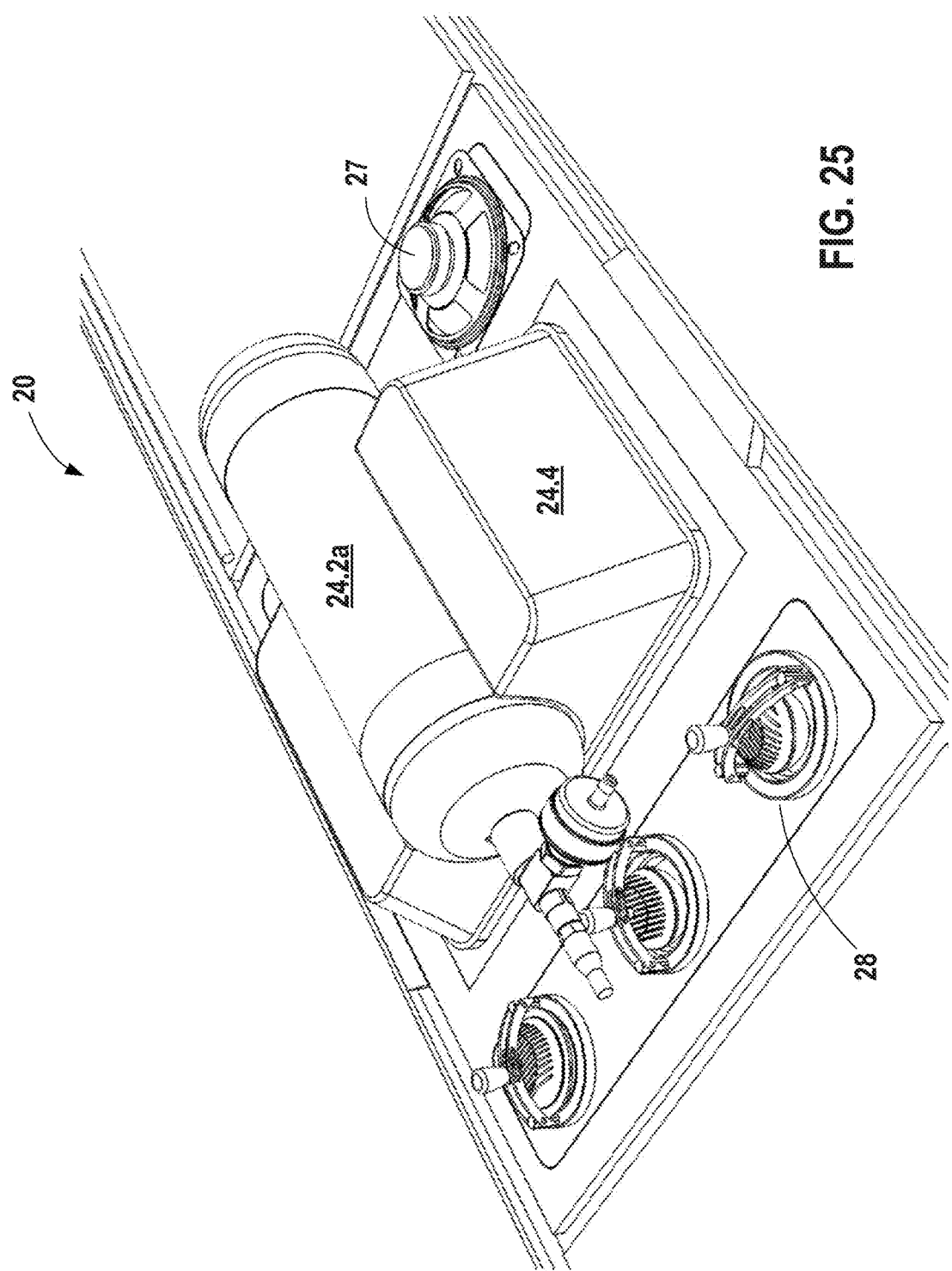
FIG. 25 is a pictorial bottom view of an embodiment of the PSU.

FIG. 25 is a bottom pictorial view illustrating placement of the various PSU 20 components, along with example dimensions for the PSU. As can be seen in FIG. 25, the task lights 28 occupy a leftmost position, and the oxygen canister 24.2*a* a rightmost position. The oxygen masks 24.2*b* (above the panel) are located to the left of the oxygen canister 24.2*a*, and the lighted sign/display 21, speaker 27, and call light 28*a*, are located to the left of the masks 24.2*b*.

Figure 21:
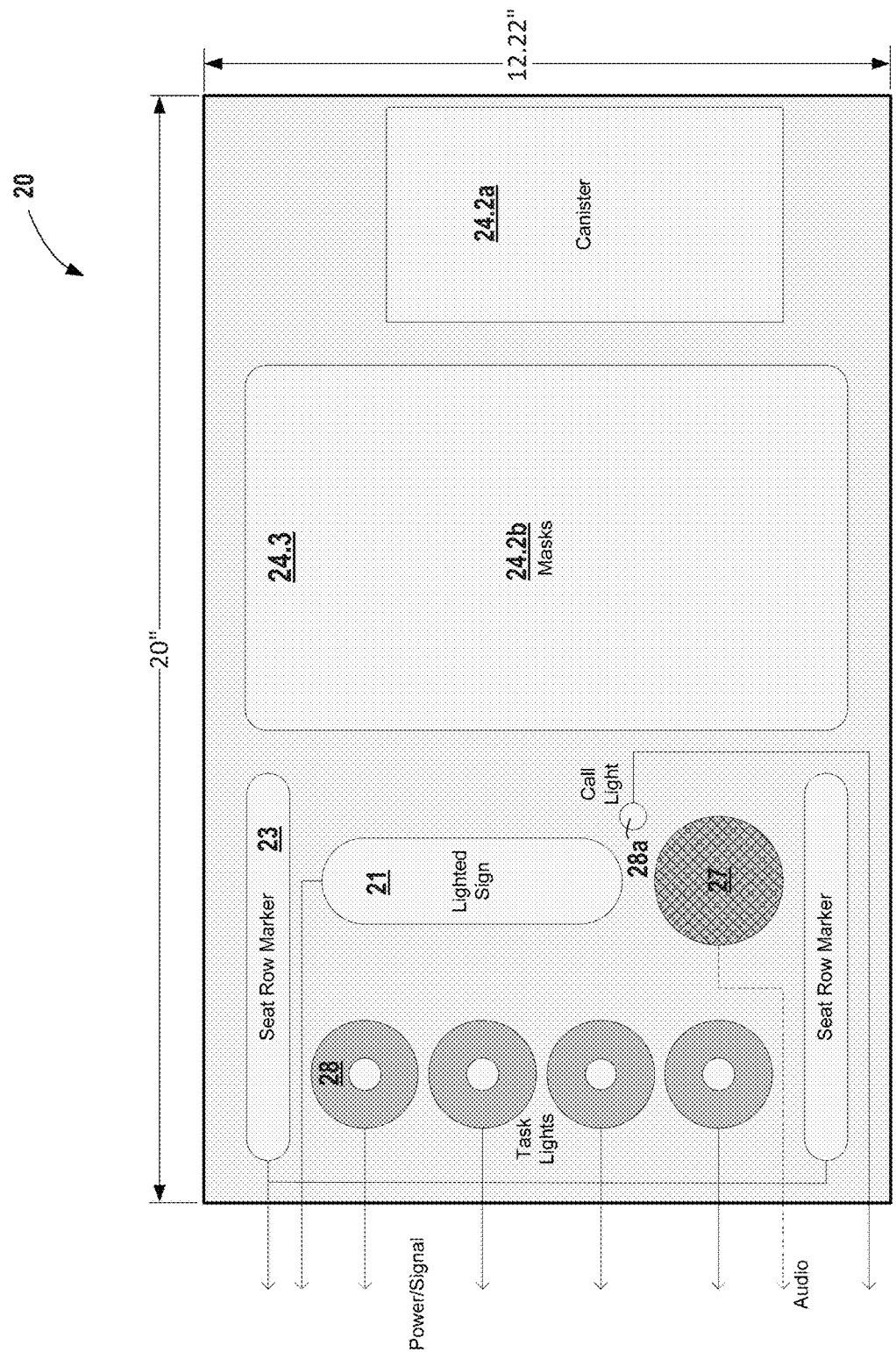
FIG. 21 is a pictorial perspective bottom view of another embodiment of the PSU.
Figure 22:
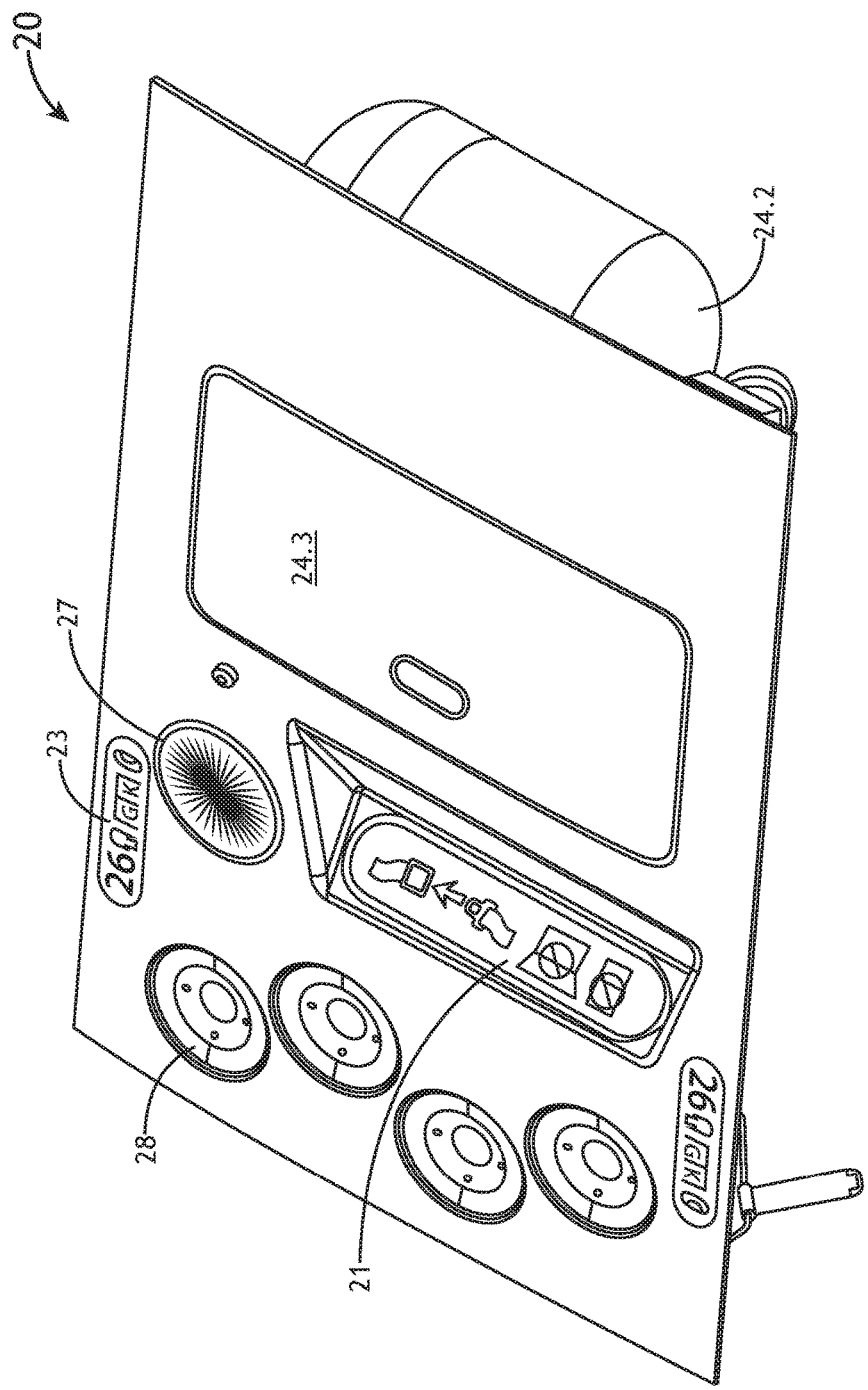
FIG. 22 is a pictorial perspective top view of an embodiment of the PSU.

FIG. 21 is a pictorial perspective bottom view of the modified traditional embodiment in which the PSU has a generally flat bottom surface with the exception of the display 21, which may protrude from the bottom surface for easier viewing. This design shows the location of an oxygen mask door panel 24.3 and an oxygen canister 24.2 located at one end of the PSU 20. FIG. 22 is a detailed perspective top view illustrating a configuration of the various PSU components.

Figure 26:
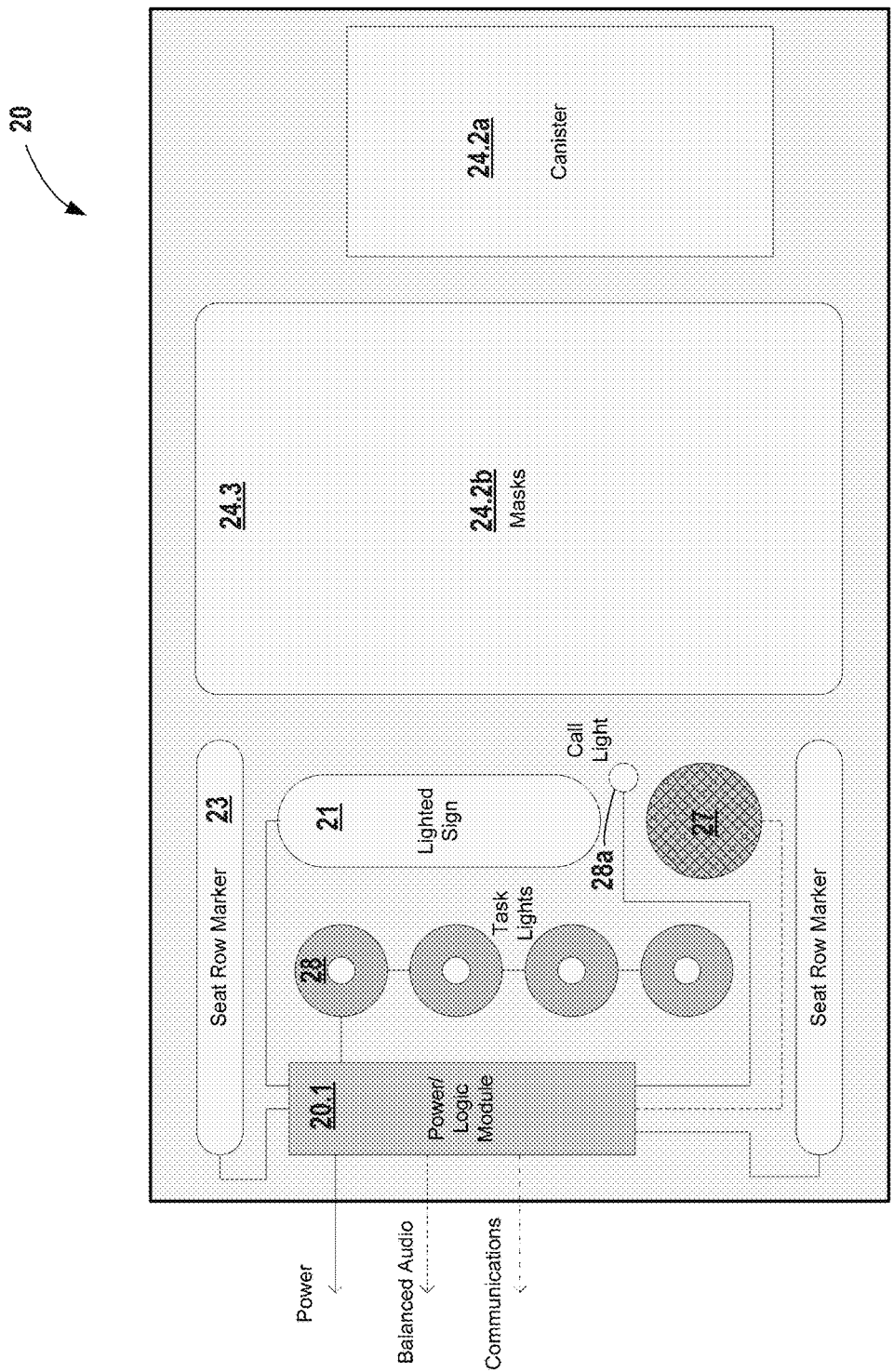
FIG. 26 is a pictorial bottom view of an embodiment of the PSU that includes the power/logic module.

FIG. 26 illustrates a design using the centralized architecture. The lights for this approach leverage the same technologies deployed in the architecture discussed above while eliminating redundant power and control circuitry. Moreover, this integrated architecture offloads all power supply functionality, control logic, and optionally oxygen system functionality onto one PC board, the power/logic module 20.1. This power/logic module can be centrally located in the PSU 20 or located at one side, as illustrated in FIG. 26, and allows for a single point of entry for power, control, and audio. The advantages for this configuration include:

a. task/reading lights 28, seat row markers 23, signage 21, and call light 28*a* internal power supplies are not needed, leading to possible lower weight and costs;

b. power supply front end protection devices are designed once and are common across the entire PSU 20;

c. external shipside cable management and power quality certification can be leveraged, leading to possible lower PSU cable weight and costs;

d. a power supply that can support an 11.4 VAC/VDC-30 VAC/VDC input range, as required or optional 115 VAC, 400 Hz input;

e. the ability to power other systems, such as washlighting, USB charging, etc.;

f. use a single input connector per PSU 20;

g. provide audio amplification on the power/logic board 20.1 accepting differential audio signal or digital formats;

h. provide a common look/feel in a normalized manner, such as fade in/out transition times or illumination profiles as required; and i. allow advanced occupancy sensing technology to dim lights, adjust volume, etc.

The unified and centralized architecture also enables BIT/BITE simplicity and can leverage a common microcontroller leading to a streamlined RTCA/DO-178/254 documentation process, as applicable.

Regarding the physical construction, the PSU panel is designed to have a simplified modular construction that lends itself readily to kit design components and helps to reduce the part count. The modules may comprise a lighting module/panel portion 28 (e.g., a 2, 3, 4, or n number of lights to conform to a particular vehicle configuration), an oxygen module 24 that comprises the oxygen bottle/canister 24.2*a*, masks 24.2*b*, and related hardware, and a sign module 21 that displays signs (seatbelt, etc.) to the user.

The panel may be designed to have a smooth bottom surface when viewed from the bottom (customer view) (see FIGS. 14, 17, 18). In an embodiment, it has a monolithic construction or at least is manufactured to have a surface that is contiguous. In an embodiment, the contiguous surface has a large planar portion. In an embodiment, the sign module portion has a translucent or semi-transparent cover (such a cover could cover the entire lower portion of the panel) so that the illuminated signs can be visible through the cover, but the cover can hide or reduce visibility of components that the customers should not see. This can be achieved by specific positioning of the lighting and other components, the use of a masked coating, which blocks the translucent cover in all areas other than the sign areas. In this way, electronics, masks, oxygen bottles, etc. are not visible to the customers during normal use.

The PSU panel may be designed so that it utilizes a drop hinge or an articulated hinge. This permits the panel to drop away when oxygen masks need to be deployed, yet at the same time retains a clean and uncluttered appearance during normal operation of the vehicle.

Figure 23:
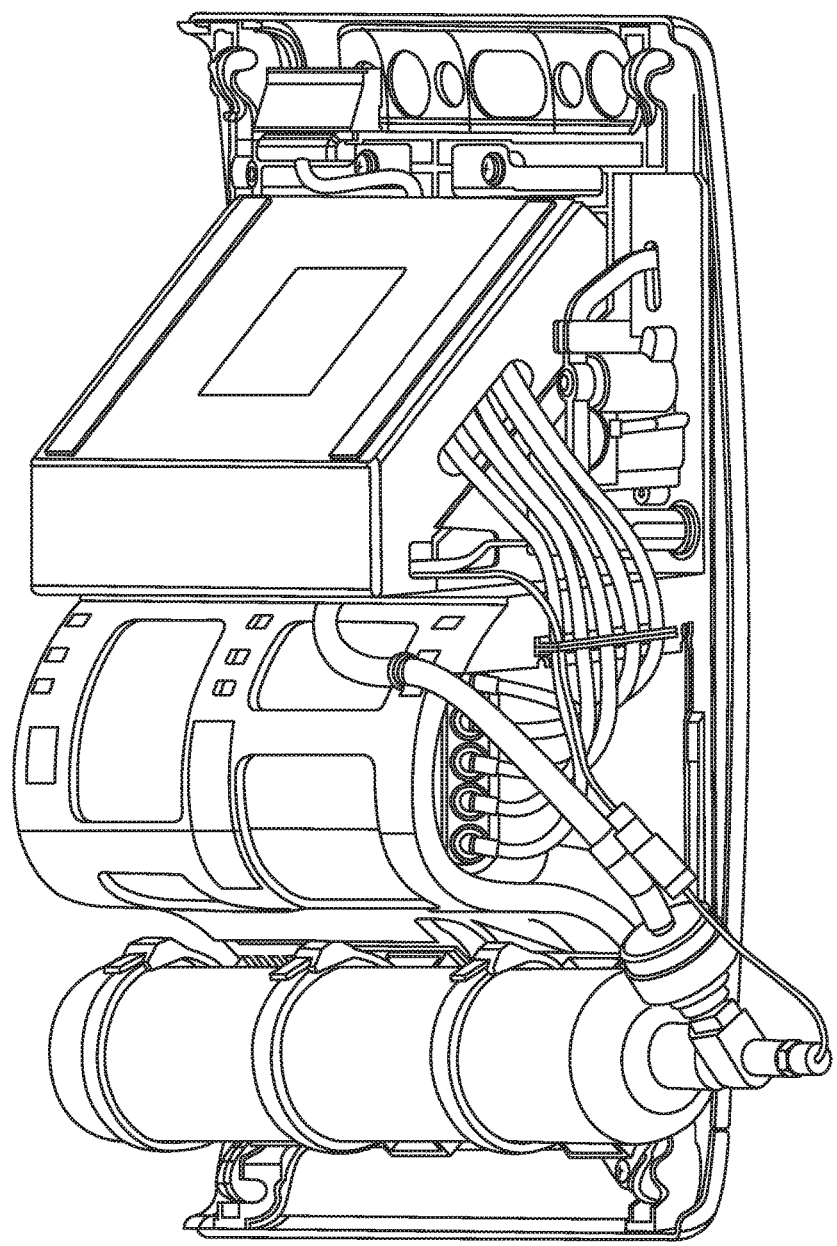
FIG. 23 is pictorial perspective top view of another embodiment of the PSU.
Figure 24:
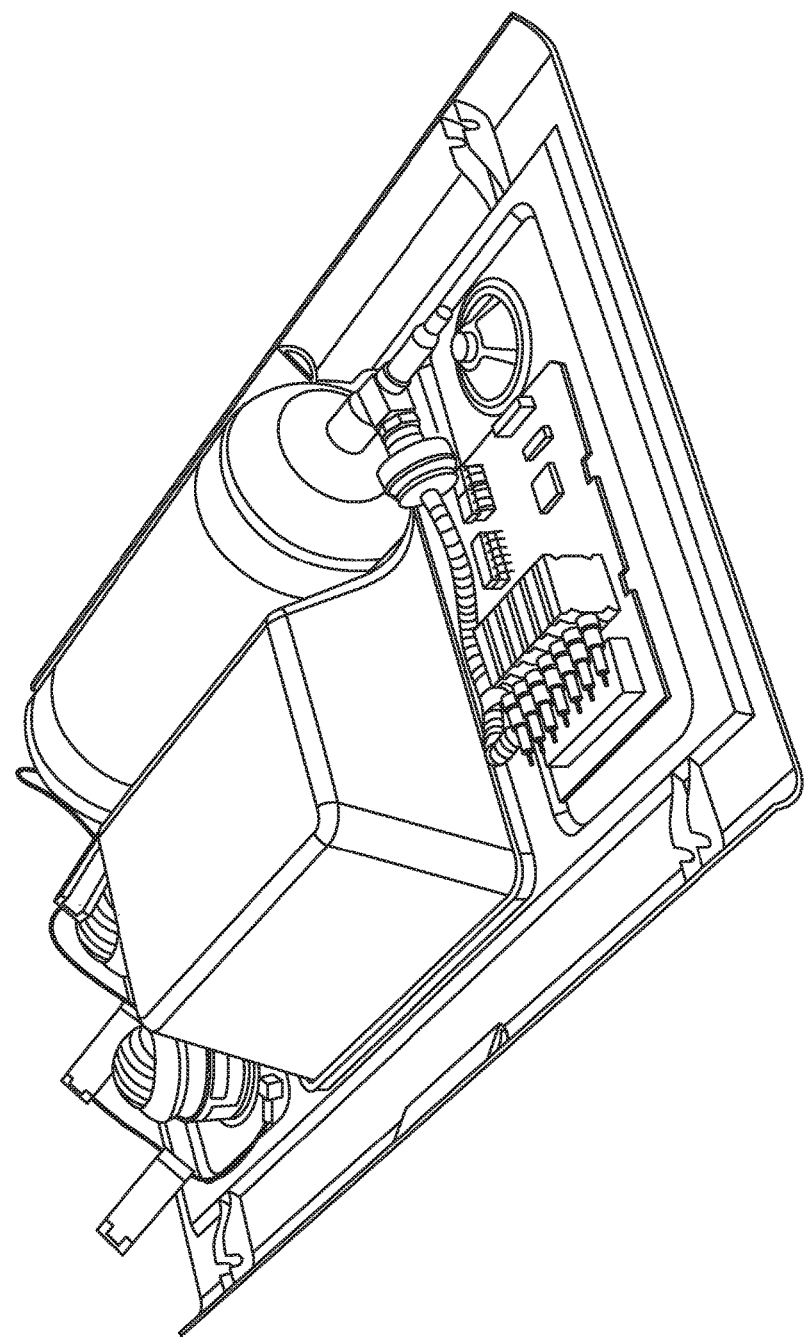
FIG. 24 is pictorial perspective top view of a further embodiment of the PSU.

In certain embodiments (FIGS. 24, 25), the oxygen bottle/canister 24.2*a* can be turned 90 degrees with respect to the other electronic components and orientation with respect to the seats (the axial direction of the cylindrical canister is perpendicular to the viewing direction of the seat locations) to make maximum use of available space. In other embodiments (FIGS. 22, 23), the axial direction is parallel to the viewing direction). In an embodiment (FIG. 24), a bottle mount 24.4 may be provided on the mask housing. This can permit a maximum storage situation when the masks are packed, while at the same time capable of being deployed.

Centralized Architecture with Integrated Speaker

Figure 27:
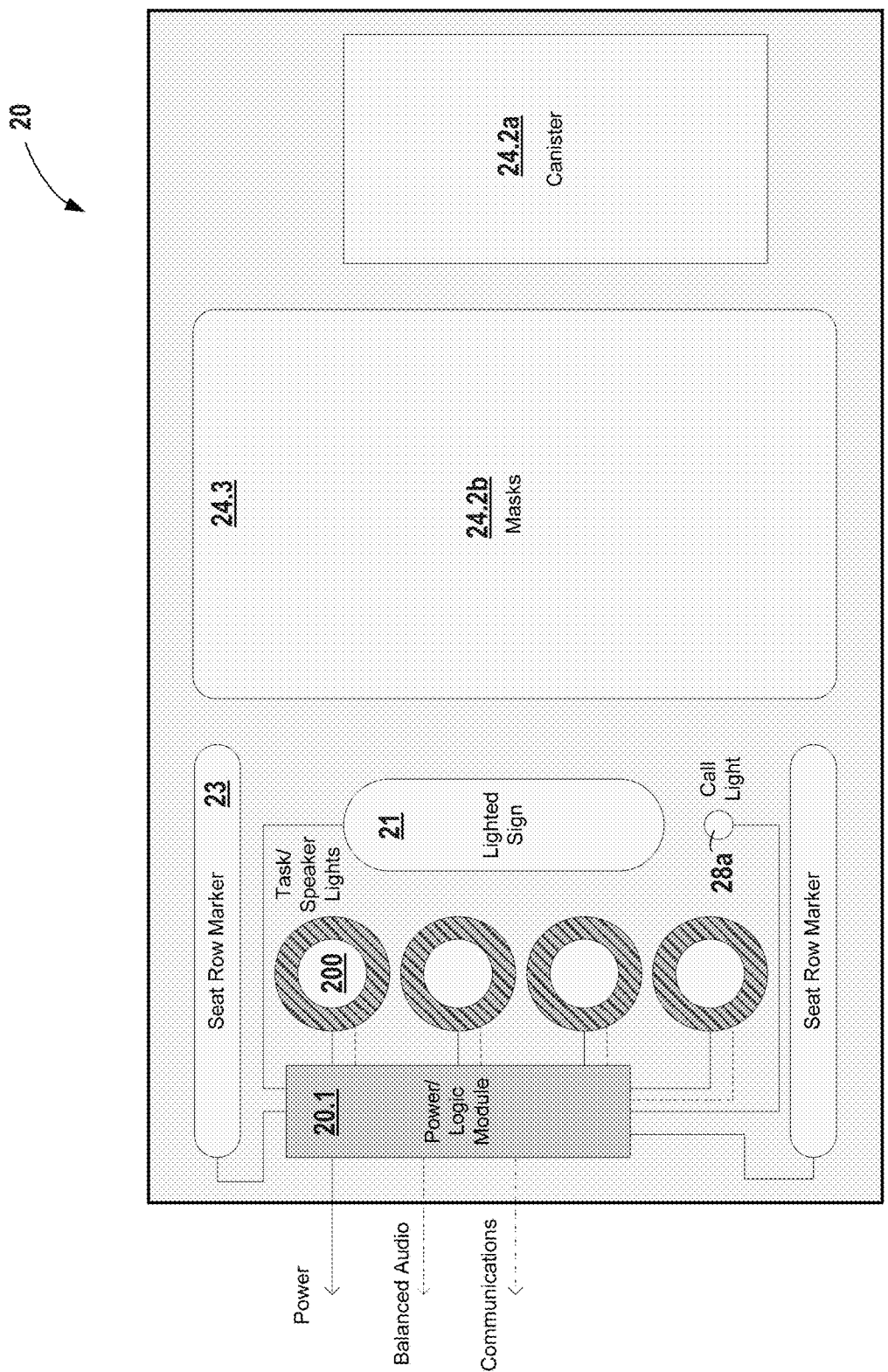
FIG. 27 is a pictorial bottom view of an embodiment of the PSU that includes the integrated speaker-light component.

FIG. 27 illustrates an architecture that utilizes a centralized power and control system within each SU along with a vertically integrated task/light and speaker. Known vehicle speakers typically are old large paper cone type speakers, which require large amplifiers. Such speakers are not tuned for optimal sound quality. The speaker cone is heavy and not ideal for high frequency response, which is important for intelligible audio, and such speakers take up space on the PSU 20 (where real estate is valuable). Furthermore, the speaker takes up a large volume above it (meaning other things cannot be mounted in this volume).

New LED technology is much more efficient than traditional incandescent or fluorescent lighting. LEDs themselves, along with drive circuitry, can be shared with circuitry used to drive the speaker which frees up space in the real estate formerly occupied by both the light and the speaker. In one embodiment, the speaker is vertically integrated into the reading light so that they can share a common housing.

Since the reading light is already directional and is usually pointed at the user, this configuration benefits the inclusion of the speaker as well. Having individual speakers that are directed to the user means that the size can be reduced (such a speaker can be, e.g., 2" in diameter).

Additionally, a speaker of this size has a higher frequency response because the cone is smaller and lighter than older traditional vehicle speaker designs. This is horn loaded and is tuned to treble, which helps with voice intelligibility, giving a nice clean sound. This speaker can use a small point-of-load amplifier, as opposed to a large amplifier that would be needed to drive the larger traditional speakers. The small amplifier can receive audio data or digital data, and in either case can be uniquely adjusted for each user. If a digital signal is used, the digital signal processing (DSP) and further processing/enhancements of the audio can be done. Such processing can include equalization and phase correction (to the extent that others' speaker outputs may be undesirably combined with the current speaker). However, in general, the small speakers being directional means that a passenger typically will not hear their neighbor's speaker, and will not get multiple phases of their sound (delay).

This approach would have the same features, benefits and technologies deployed in the systems described above as well as providing added value and functionality by incorporating high a quality speaker into the task/reading light assembly. The value this provides includes: weight savings, and space savings for other PSU and oxygen system components.

The mass/volume savings (since traditional heat sinking can be reduced or eliminated when using LED technology) are then replaced with a water resistant speaker that is compression loaded into a horn configuration.

The speaker may be located in the back of the light where the heat sink was previously located. It can pass the sound through a throat, and thus it forms a horn that directionalizes the sound. The reading light assembly is levitated within the throat of that horn, and the speaker sound feeds through it.

Figure 28:
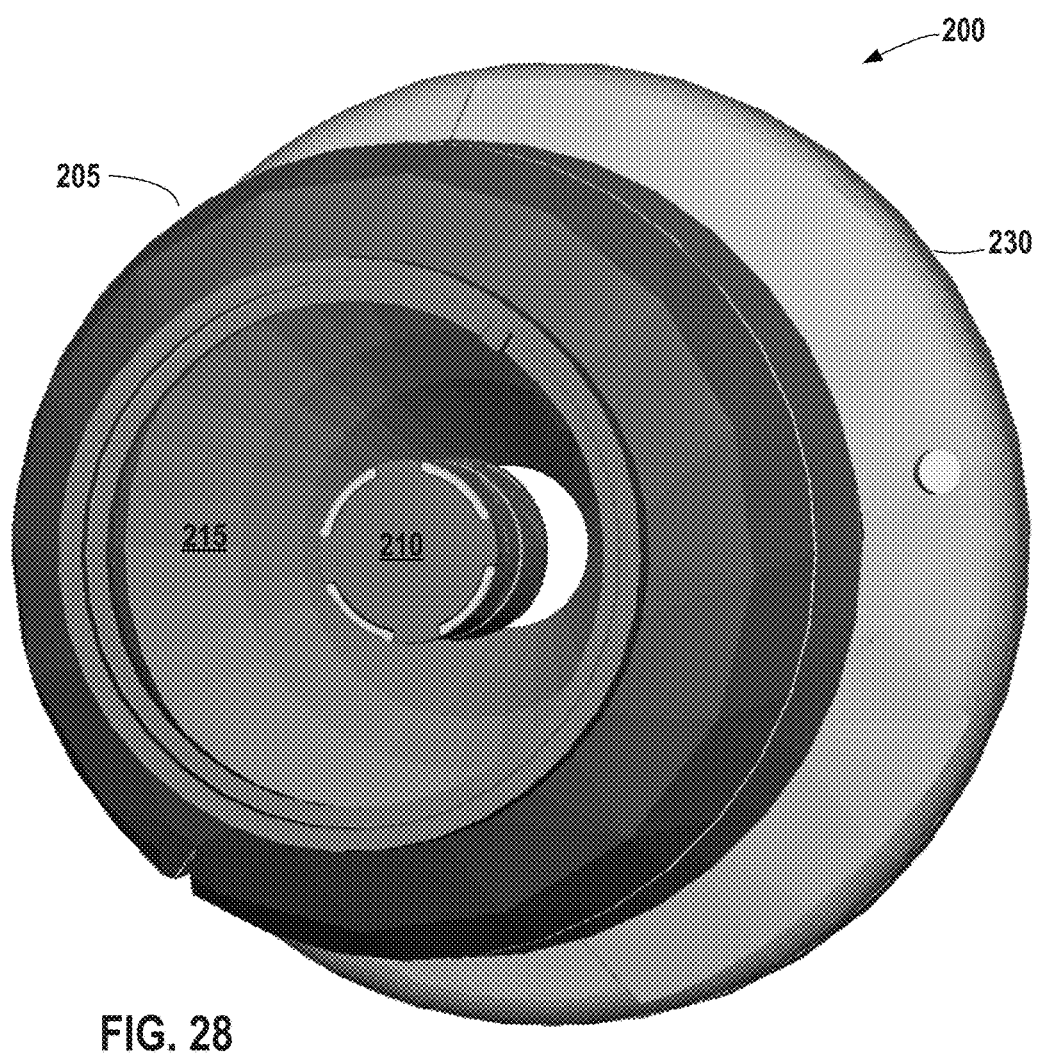
FIG. 28 is a bottom perspective view of the integrated speaker-light component.
Figure 29:
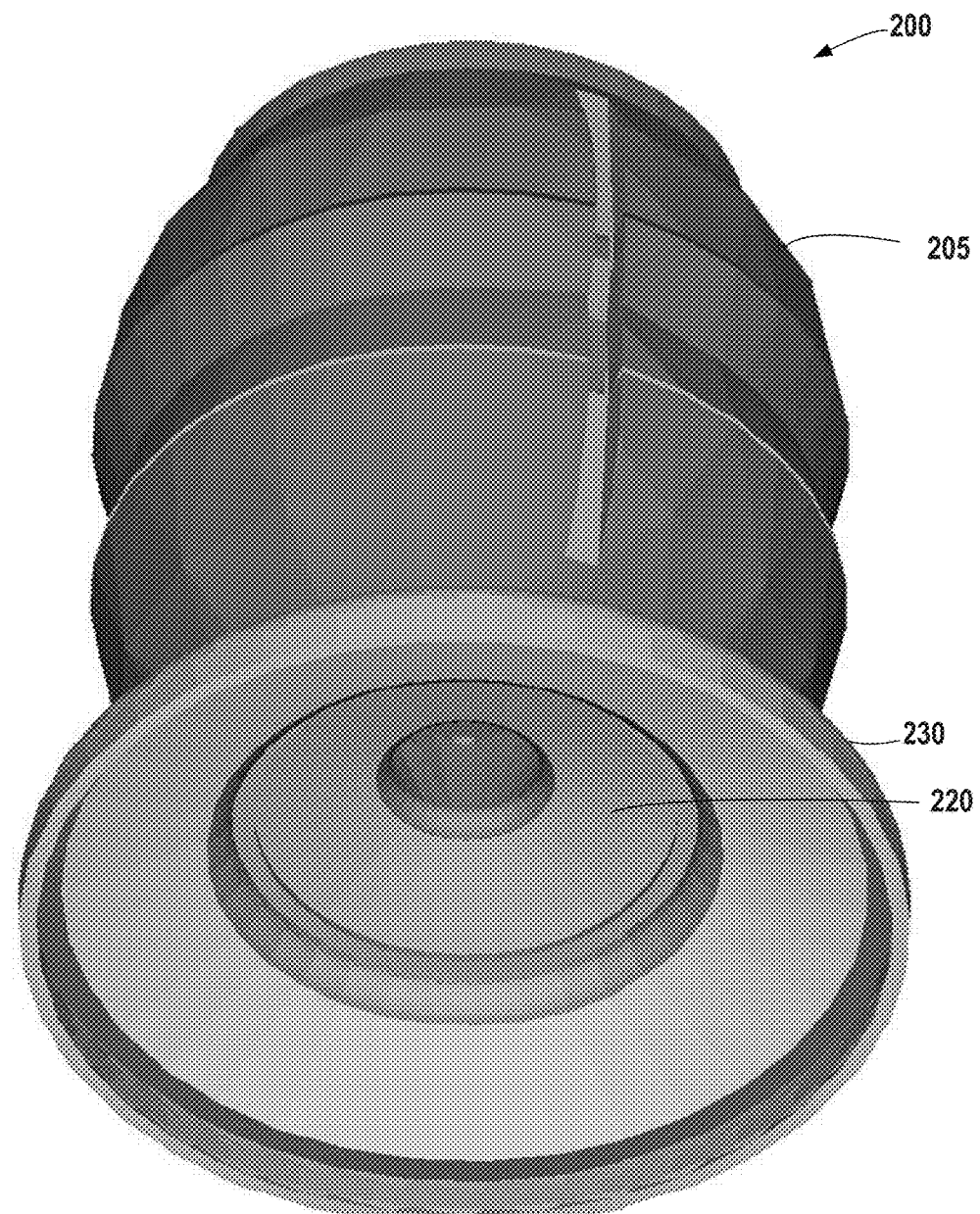
FIG. 29 is a top perspective view of the integrated speaker-light component.
Figure 30:
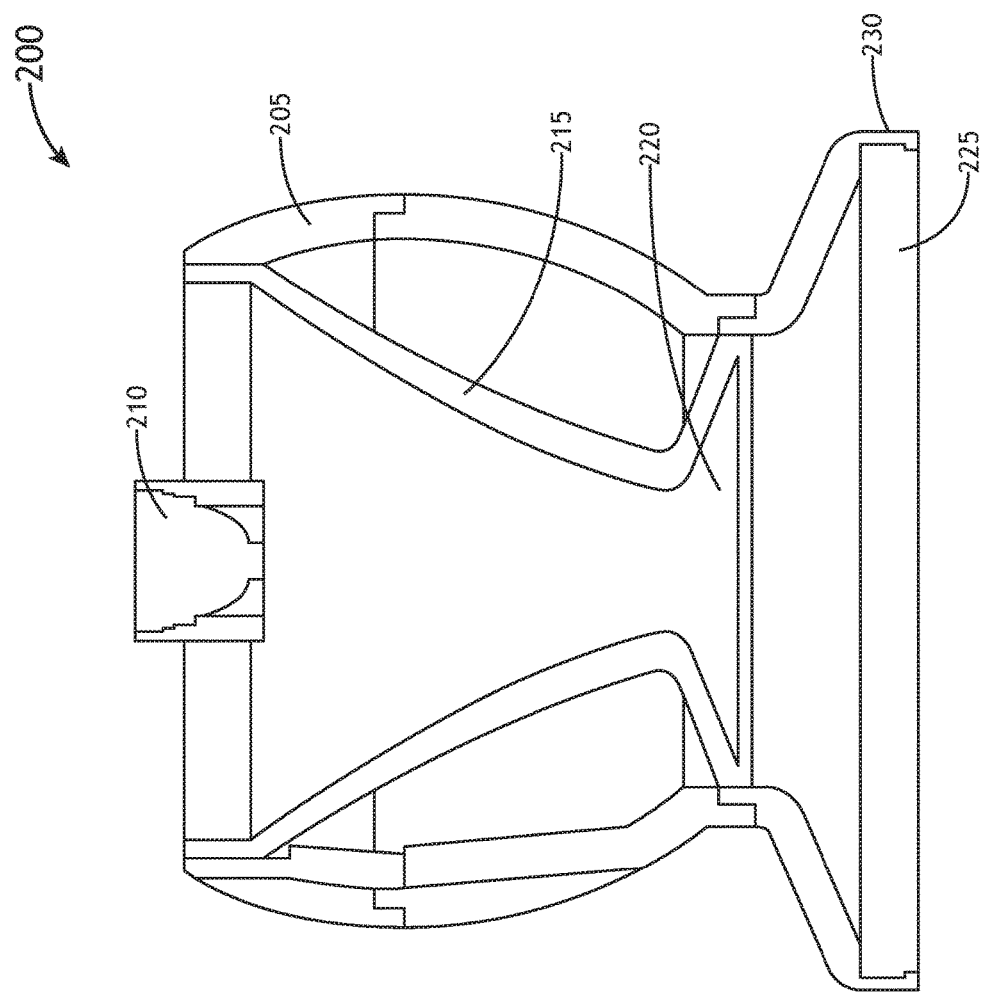
FIG. 30 is a cross-sectional side view of the integrated speaker-light component.

FIG. 27 illustrates an embodiment of this design, an integrated speaker/task light 200 is provided, which saves space on the PSU 20. FIG. 28 is a bottom perspective view of the integrated unit 200 illustrating a housing 205 which may be of a truncated spherical form, an LED light module 210, a speaker horn 215, and a mount 230. FIG. 29 is a top perspective view of the integrated unit 200 showing, in addition, the speaker 220. FIG. 30 is a cross-sectional side view of the integrated unit 200, additionally showing the location of the speaker/light electronics 225.

"Horn tuning" can be used to directivity and sound pressure level (SPL) in the upper-mid to high frequency range (5 k-20 k Hz) which improves intelligibility within the audible range. Free air architecture allows the PSU to act as an enclosure for low frequency extension. Further tuning can be accomplished via the offloaded amplifier circuit for enhancing audio perception.

Figure 31:
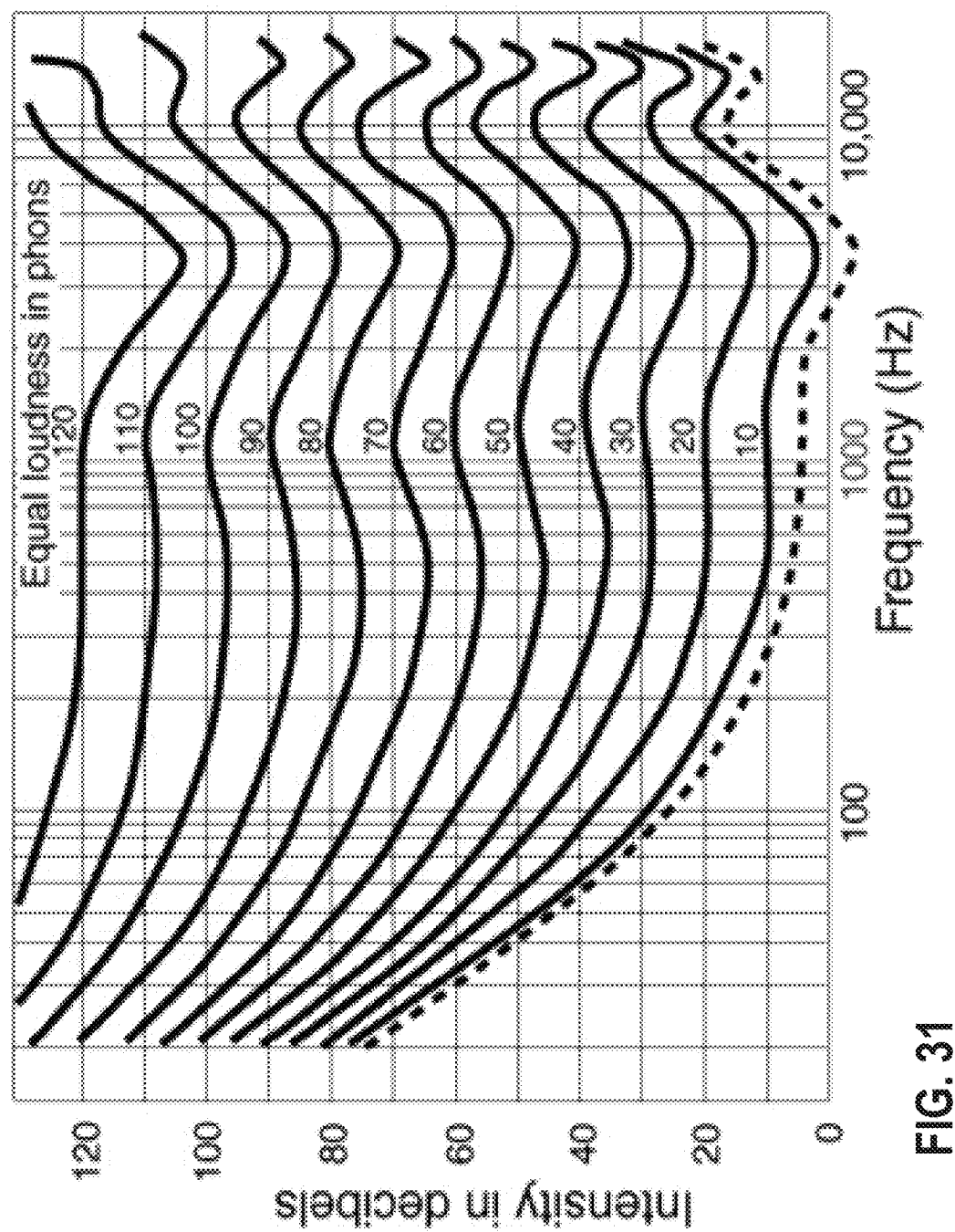
FIG. 31 is a graph illustrating frequency response curves at different equal loudness levels.

Performance of this new approach surpasses existing PSU speaker technology since legacy products are not designed to produce comparable high frequency response characteristics and have to be played at higher SPL levels to achieve similar performance. Other advantages include the application of a slight notch filter in the mid frequency range (~2 k-5 k Hz) which addresses a "voice squawk" that is often discomforting to passengers (reference Fletcher-Munson Curves, also known as the "equal-loudness contours", illustrated in FIG. 31).

Thus, this integrated design is advantageous in that it is weight neutral with respect to existing task/reading lights, and creates an overall net weight reduction per PSU due to elimination of the PSU speaker. The speaker provides a superior sound quality, directivity, control, and minimization of distortion. Through the use of tunable sound filters, click/pop suppression and soft clipping can be provided in either analog or digital form. The speaker may not be required for all task/reading lights and/or PSU panels. In one embodiment, alternating assemblies can be utilized which may lead to further ship set weight savings. The vertically integrated task light and speaker may be used with any of the proposed architectures discussed above.

Centralized Rib or Group Architecture

FIG. 32 illustrates a centralized rib or group architecture that utilizes a centralized power and control system outside of each SU.

This approach leverages the same technologies and applicable features and benefits of the architectures described above. Additionally, this architecture offers even more synergy and possible part count reduction by eliminating redundant circuitry via offloading the power/logic module 140 to a separate assembly that feeds a group of PSU's 130. Costs can be potentially lowered by a reduction in overall 115 VAC, 400 Hz shipside power supply count/capacity that typically require a larger front end for power factor correction and harmonic distortion reduction. This has traditionally been a major cost/weight driver for individual power supplies. The architecture is scalable and may be integrated into existing aircraft subsystems.

The lighting elements may be individual LRUs and are either vertically integrated LED based components or are LED driven fiber optic end nodes that can also be designed in a modular fashion thus enabling increased commonality and flexibility. For instance, fiber optic/light pipes and associated driver engines can be utilized to transmit light to task/reading, ordinance, call lights, etc. This offloads all LED's and their associated electronics/heat sources to a single LRU. This multiplexed light engine could have its own passive thermal management and power supply with multiple collimated fiber outputs that can have a range of several feet. Reliability is enhanced by virtue of commonality and reduced part numbers/count. Power and control to this LRU is a single feed for multiple SU's. Communications may be daisy chained via a TIA-485 architecture or a similar multi-drop topology.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the invention.

| TABLE OF REFERENCE CHARACTERS | |
|---|---|
| 1 | cabin system |
| 2 | main cabin lighting |
| 4 | passenger address system |
| 6 | in-flight entertainment system |
| 8 | passenger connectivity system |
| 10 | crew mobile devices |
| 12 | in-seat power |
| 13 | control panel |
| 14 | common network |
| 15 | lighting system |
| 15.1 | lighting controller |
| 16 | monuments |
| 18 | seat systems |
| 19 | in-cabin connectivity |
| 20 | passenger service unit (PSU) |
| 20.1 | PSU controller |
| 21 | programmable active display/information sign |
| 23 | dynamic seat row marker |
| 23.1 | status portion |
| 23.2 | additional status portion |
| 24 | oxygen supply system |
| 24.1 | oxygen controller |
| 24.2 | oxygen system equipment |
| 24.2a | oxygen canister |
| 24.2b | oxygen mask |
| 24.3 | oxygen mask door panel |
| 24.4 | bottle mount |
| 26 | call button |
| 27 | speaker |
| 28 | task (reading) lights |
| 28a | call light |
| 29 | PCB, flexible (flex) PCB |
| 29a | LED portion of flex PCB |
| 29a1 | LED extended PCB portion |
| 29a2 | LED |
| 29b | control circuitry portion of flex PCB |
| 29b1 | connector |
| 30 | first cable bundle connector |
| 32 | second cable bundle connector |
| 33 | third cable bundle connector |
| 34 | first cable bundle (OEU drops) |
| 34' | combined cable bundle |
| 34.1 | power |
| 34.2 | RS-485 |
| 35 | single connector for single wire bundle |
| 36 | second cable bundle (OEU feeds) |
| 38 | oxygen (3rd) system cable bundle |
| 38.1 | power |
| 38.2 | CANBUS |
| 40 | single connector |
| 42 | single wire bundle (SU drops) |
| 100 | overhead equipment unit (OEU) |
| 110 | cabin services system (CSS) |
| 120 | zone management unit (ZMU) |
| 130 | smart service unit (SSU) w/ service unit control system |
| 150 | oxygen power |
| 200 | integrated speaker/task light |
| 205 | housing; truncated spherical housing |
| 210 | LED light module |
| 215 | horn |
| 220 | speaker |
| 225 | speaker and light electronics |
| 230 | mount |

What is claimed is:

1. A passenger service unit for an aircraft cabin, comprising:
an oxygen supply module comprising an oxygen canister and a plurality of oxygen masks;
a lighting module comprising a plurality of LED reading light units disposed on a single contiguous flexible printed circuit board;

at least one mini-speaker comprising a horn element, wherein a first mini-speaker of the at least one mini-speaker is integrated with a first LED reading light unit of the plurality of LED reading light units, an LED for illuminating the first LED reading light unit is at least partially disposed in the horn element of the first mini-speaker, and sound waves from the first mini-speaker travel adjacent to the LED, wherein the horn element of the first mini-speaker is shaped and positioned with respect to the first LED reading light unit such that a geometric plane passes through the first LED reading light unit and a circular cross-section of the horn element of the first mini-speaker; and control circuitry for controlling the oxygen supply module, the lighting module, and the at least one mini-speaker, wherein the control circuitry is connected to
 a power converter for converting an external power supply to voltage usable by the control circuitry, and
 a single communications interface for communicating with an external management computing system.

2. The passenger service unit of claim 1, wherein the at least one mini-speaker further comprises three mini-speakers each integrated with a corresponding LED reading light unit of the plurality of LED reading light units.

3. The passenger service unit of claim 1, wherein a sound output of the first mini-speaker is directionally optimized to direct sound to a passenger positioned to use the first LED reading light unit.

4. The passenger service unit of claim 1, wherein the control circuitry further comprises audio control circuitry for providing an audio signal to the at least one mini-speaker, the audio control circuitry including an amplifier and at least one audio filter.

5. The passenger service unit of claim 1, further comprising a sign module for presenting lighted information to passengers seated beneath the passenger service unit.

6. The passenger service unit of claim 5, wherein the sign module comprises a dynamic seat row marker for indicating at least one of a status of a passenger and a trip aspect, wherein the dynamic seat row marker is readily viewable from an adjacent aisle to a mounting position of the passenger service unit.

7. The passenger service unit of claim 6, wherein the dynamic seat row marker is configured to identify a meal preference of a passenger seated beneath the passenger service unit.

8. The passenger service unit of claim 5, wherein the sign module comprises a programmable active display providing trip changeable information regarding a flight for passenger review.

9. The passenger service unit of claim 8, wherein the programmable active display is configured to display luggage claim information.

10. The passenger service unit of claim 5, wherein the oxygen canister of the oxygen supply module is mounted perpendicular to a longitudinal axis of the sign module.

11. The passenger service unit of claim 5, further comprising a translucent cover disposed over the sign module.

12. The passenger service unit of claim 11, wherein the translucent cover is a portion of a cover disposed over an entire bottom portion of the passenger service unit.

13. The passenger service unit of claim 1, further comprising a single connector for a single wire bundle entering the passenger service unit from an external source, the single wire bundle comprising the single communication interface and a power supply to the passenger service unit.

14. The passenger service unit of claim 1, wherein at least the first mini-speaker of the at least one mini-speaker is configured to execute a slight notch filter in a frequency range from 2 kHz to 5 kHz.

15. A passenger service unit for an aircraft cabin, comprising:
a lighting module comprising a plurality of LED reading light units disposed on a single contiguous flexible printed circuit board, wherein at least one LED reading light unit is an integrated speaker-light comprising a mini-speaker integrated with an LED, the mini-speaker comprising a horn element, wherein the LED illuminates through the horn element, wherein the horn element has a circular cross-section; and
control circuitry for controlling the lighting module, and the at least one mini-speaker, wherein the control circuitry is connected to
a single power converter for converting an external power supply to voltage usable by the control circuitry, and
a single communications interface for communicating with an external management computing system.

16. The passenger service unit of claim 15, wherein the control circuitry is also disposed on the single contiguous flexible printed circuit board.

17. The passenger service unit of claim 16, wherein the flexible printed circuit board comprises a control circuitry portion separated from an LED portion by a gap in the flexible printed circuit board, wherein at least one connecting extension connects the control circuitry portion to the LED portion.

18. The passenger service unit of claim 15, wherein the horn element of the mini-speaker is at least partially surrounded by a housing of the integrated speaker-light.

* * * * *